(12) United States Patent
Crudden et al.

(10) Patent No.: US 12,319,985 B2
(45) Date of Patent: *Jun. 3, 2025

(54) NICKEL-BASED ALLOY

(71) Applicant: ALLOYED LIMITED, Yarnton Kidlington (GB)

(72) Inventors: David Crudden, Yarnton (GB); John William Gordon Clark, Yarnton (GB); Andre Nemeth, Yarnton (GB)

(73) Assignee: ALLOYED LIMITED, Kidlington (GB)

( * ) Notice: Subject to any disclaimer, the term of this patent is extended or adjusted under 35 U.S.C. 154(b) by 383 days.

This patent is subject to a terminal disclaimer.

(21) Appl. No.: 17/766,145

(22) PCT Filed: Sep. 29, 2020

(86) PCT No.: PCT/GB2020/052349
§ 371 (c)(1),
(2) Date: Apr. 1, 2022

(87) PCT Pub. No.: WO2021/064358
PCT Pub. Date: Apr. 8, 2021

(65) Prior Publication Data
US 2022/0349031 A1 Nov. 3, 2022

(30) Foreign Application Priority Data

Oct. 2, 2019 (GB) .................................. 1914217

(51) Int. Cl.
*C22C 19/05* (2006.01)
(52) U.S. Cl.
CPC .......... *C22C 19/055* (2013.01); *C22C 19/056* (2013.01)
(58) Field of Classification Search
CPC .................................. C22F 1/10; C22C 19/056
See application file for complete search history.

(56) References Cited

U.S. PATENT DOCUMENTS

| | | |
|---|---|---|
| 3,941,590 A | 3/1976 | Watanabe |
| 5,130,089 A | 7/1992 | Henry |
| 5,476,555 A | 12/1995 | Erickson |
| 5,882,586 A | 3/1999 | Tamura et al. |
| 6,051,083 A | 4/2000 | Tamaki et al. |
| 6,177,046 B1 | 1/2001 | Simkovich et al. |
| 6,284,392 B1 | 9/2001 | Seth et al. |
| 6,478,897 B1 | 11/2002 | Izumida et al. |
| 6,706,241 B1 * | 3/2004 | Baumann ............... C22C 19/056 148/428 |
| 6,908,519 B2 | 6/2005 | Raymond et al. |
| 7,014,723 B2 | 3/2006 | Beck et al. |
| 7,854,809 B2 | 12/2010 | Arrell et al. |
| 9,243,514 B2 | 1/2016 | Krotzer, Jr. et al. |
| 9,352,421 B2 | 5/2016 | Illston |
| 9,670,572 B2 | 6/2017 | Etter et al. |
| 11,180,840 B2 | 11/2021 | Goncharov et al. |
| 11,459,640 B2 | 10/2022 | Goncharov et al. |
| 11,634,792 B2 * | 4/2023 | Crudden ............... C22C 19/056 420/448 |
| 2004/0022661 A1 | 2/2004 | Wood et al. |
| 2004/0177901 A1 | 9/2004 | Yoshinari et al. |

(Continued)

FOREIGN PATENT DOCUMENTS

| | | |
|---|---|---|
| DE | 102015016729 | 6/2017 |
| EP | 0403682 | 12/1990 |

(Continued)

OTHER PUBLICATIONS

El-Bagoury et al., "Effect of various heat treatment conditions on microstructure of cast polycrystalline IN738LC alloy" *Materials Science and Engineering A* 2008, 487(1-2), 152-161.
International Search Report and Written Opinion Issued in Corresponding PCT Patent Application No. PCT/GB2018/052124, mailed Nov. 7, 2018.
International Search Report and Written Opinion Issued in Corresponding PCT Patent Application No. PCT/GB2020/052349, dated Nov. 3, 2020.
International Search Report issued in the priority International Application No. PCT/GB2020/051330, dated Aug. 13, 2020.
Search Report Issued in Corresponding United Kingdom Patent Application No. GB1712196.3, dated Feb. 20, 2018.
Ghoussoub et al., "On the Influence of Alloy Chemistry and Processing Conditions on Additive Manufacturability of Ni-Based Superalloys" Superalloys 2020, The Minerals, Metals & Materials Series, 153-162.

(Continued)

*Primary Examiner* — Jessee R Roe
(74) *Attorney, Agent, or Firm* — NORTON ROSE FULBRIGHT US LLP

(57) ABSTRACT

A nickel-based alloy composition consisting, in weight percent, of: 1.5 to 4.5% aluminium, 1.1 to 3.4% titanium, 0.0 to 4.0% niobium, 0.0 to 5.2% tantalum, 0.9 to 6.6% tungsten, 0.0 to 3.0% molybdenum, 0.0 to 24.0% cobalt, 12.5 to 20.6% chromium, 0.02 to 0.15% carbon, 0.001 to 0.015% boron, 0.0 to 0.1% zirconium, 0.0 to 3.0% rhenium, 0.0 to 2.0% ruthenium, 0.0 to 3.0% iridium, 0.0 to 0.5% vanadium, 0.0 to 1.0% palladium, 0.0 to 1.0% platinum, 0.0 to 0.5% silicon, 0.0 to 0.1% yttrium, 0.0 to 0.1% lanthanum, 0.0 to 0.1% cerium, 0.0 to 0.003% sulphur, 0.0 to 0.25% manganese, 0.0 to 0.1 magnesium, 0.0 to 5.0% iron, 0.0 to 0.5% copper, 0.0 to 1.0% hafnium, the balance being nickel and incidental impurities, wherein the following equations are satisfied in which $W_{Al}$, $W_{Ti}$, $W_{Nb}$, $W_{Ta}$ and $W_W$ are the weight percent of aluminium, titanium, niobium, tantalum and tungsten in the alloy respectively $0.65 \leq 0.3\ W_{Nb} + 0.15\ W$ $3.6 \leq W_{Al} + 0.5\ \ \ W_{Ti} + 0.3\ \ \ W_{Nb} + 0.15\ \ \ W_{Ta} \leq 5.7\ \ \ W_{Ta} + 0.92 W_W \leq 6.1$.

19 Claims, 17 Drawing Sheets

(56) References Cited

U.S. PATENT DOCUMENTS

| | | |
|---|---|---|
| 2006/0039817 A1 | 2/2006 | Kelly |
| 2007/0051199 A1 | 3/2007 | Etuve et al. |
| 2007/0095441 A1 | 5/2007 | Jiang et al. |
| 2008/0166258 A1 | 7/2008 | Tanimoto et al. |
| 2010/0059146 A1 | 3/2010 | Sato et al. |
| 2010/0296962 A1 | 11/2010 | Hasselqvist et al. |
| 2010/0329876 A1 | 12/2010 | Bain et al. |
| 2012/0251307 A1 | 10/2012 | Nishimoto et al. |
| 2012/0288400 A1 | 11/2012 | Hirata et al. |
| 2013/0323069 A1 | 12/2013 | Izumi et al. |
| 2014/0017511 A1 | 1/2014 | Izumi et al. |
| 2014/0234155 A1 | 8/2014 | Semba et al. |
| 2015/0197833 A1 | 7/2015 | Kawagishi |
| 2015/0322557 A1 | 11/2015 | Etter et al. |
| 2015/0368774 A1 | 12/2015 | Ota et al. |
| 2016/0002752 A1 | 1/2016 | Srivastava et al. |
| 2016/0167172 A1 | 6/2016 | Goncharov et al. |
| 2016/0222490 A1 | 8/2016 | Wright et al. |
| 2017/0021453 A1 | 1/2017 | Engeli et al. |
| 2017/0088919 A1 | 3/2017 | Hardy et al. |
| 2017/0189960 A1 | 7/2017 | Ibe |
| 2017/0216919 A1 | 8/2017 | Liu et al. |
| 2017/0342525 A1 | 11/2017 | Takasawa et al. |
| 2018/0002793 A1 | 1/2018 | Detor et al. |
| 2018/0002794 A1 | 1/2018 | Detor et al. |
| 2018/0023176 A1 | 1/2018 | Han et al. |
| 2018/0057921 A1 | 3/2018 | Kobayashi et al. |
| 2018/0100223 A1 | 4/2018 | Kobayashi et al. |
| 2019/0360078 A1 | 11/2019 | Hardy et al. |

FOREIGN PATENT DOCUMENTS

| | | |
|---|---|---|
| EP | 0709477 B1 | 5/1996 |
| EP | 0789087 | 8/1997 |
| EP | 1096033 | 5/2001 |
| EP | 1193321 | 4/2002 |
| EP | 1195446 | 4/2002 |
| EP | 1410872 | 4/2004 |
| EP | 1502966 | 2/2005 |
| EP | 1674596 | 6/2006 |
| EP | 1790750 | 5/2007 |
| EP | 1813690 | 8/2007 |
| EP | 1847627 | 10/2007 |
| EP | 1997921 | 12/2008 |
| EP | 2071128 | 6/2009 |
| EP | 2246449 | 11/2010 |
| EP | 2256222 | 12/2010 |
| EP | 2298946 | 3/2011 |
| EP | 2327493 | 6/2011 |
| EP | 2412833 | 2/2012 |
| EP | 2530181 | 12/2012 |
| EP | 2772329 | 9/2014 |
| EP | 2826877 | 1/2015 |
| EP | 2894234 | 7/2015 |
| EP | 3091096 | 11/2016 |
| EP | 3153271 | 4/2017 |
| EP | 3159425 | 4/2017 |
| EP | 3170609 | 5/2017 |
| EP | 3202931 | 8/2017 |
| EP | 3208354 | 8/2017 |
| EP | 3208355 | 8/2017 |
| EP | 3249063 | 11/2017 |
| EP | 3257956 | 12/2017 |
| EP | 3278901 | 2/2018 |
| EP | 3327157 | 5/2018 |
| EP | 3327158 | 5/2018 |
| EP | 3336210 | 6/2018 |
| EP | 3693105 | 8/2020 |
| FR | 3013060 | 5/2015 |
| GB | 1243155 | 8/1971 |
| JP | H09272933 | 10/1997 |
| JP | H11310839 | 11/1999 |
| JP | 2003/113434 | 4/2003 |
| JP | 2004/256840 | 9/2004 |
| JP | 2008/045176 | 2/2008 |
| JP | 2009/013450 | 1/2009 |
| JP | 2009114501 | 5/2009 |
| JP | 2009/144203 | 7/2009 |
| JP | 2009/167499 | 7/2009 |
| JP | 2012/219339 | 11/2012 |
| JP | 2013/049902 | 3/2013 |
| JP | 2013/095949 | 5/2013 |
| JP | 2013216939 | 10/2013 |
| JP | 2014/122385 | 7/2014 |
| JP | 2014/210280 | 11/2014 |
| JP | 2015/117413 | 6/2015 |
| JP | 2016/000414 | 1/2016 |
| JP | 2016/037664 | 3/2016 |
| JP | 2016/056436 | 4/2016 |
| JP | 2016/196685 | 11/2016 |
| JP | 2017/179592 | 10/2017 |
| JP | 2018/123359 | 8/2018 |
| JP | 2018/145456 | 9/2018 |
| JP | 2018168400 | 11/2018 |
| KR | 10-20170058065 | 5/2017 |
| SE | 328414 | 9/1970 |
| WO | WO 2004/065645 | 8/2004 |
| WO | WO 2011/054864 | 5/2011 |
| WO | WO 2011/062231 | 5/2011 |
| WO | WO 2013/101692 | 7/2013 |
| WO | WO 2014/025432 | 2/2014 |
| WO | WO 2014/124626 | 8/2014 |
| WO | WO 2014/126086 | 8/2014 |
| WO | WO 2014/150323 | 9/2014 |
| WO | WO 2014/165073 | 10/2014 |
| WO | WO 2015/096980 | 7/2015 |
| WO | WO 2016/158705 | 10/2016 |
| WO | WO 2016/209591 | 12/2016 |
| WO | WO 2017/100169 | 6/2017 |
| WO | WO 2018/036797 | 3/2018 |
| WO | WO 2018/071328 | 4/2018 |
| WO | WO 2018/092204 | 5/2018 |
| WO | WO 2018/151222 | 8/2018 |
| WO | WO 2018/151262 | 8/2018 |
| WO | WO 2018/155446 | 8/2018 |
| WO | WO 2018/181098 | 10/2018 |
| WO | WO 2018/216067 | 11/2018 |
| WO | WO 2019/004176 | 1/2019 |
| WO | WO 2019/021015 | 1/2019 |
| WO | WO 2020/115478 | 6/2020 |
| WO | WO 2020/245575 | 12/2020 |

OTHER PUBLICATIONS

Tang et al., "The Effect of Heat Treatment on Tensile Yielding Response of the New Superalloy ABD-900AM for Additive Manufacturing" Superalloys 2020, The Minerals, Metals & Materials Series, 1055-1065.

Cruchley et al., "Chomia layer growth on a Ni-based superalloy: Sub-parabolic kinetics and the role of titanium", *Corrosion Science*, 2013.

Crudden, D.J. et al., "Modelling of influence of alloy composition on flow stress in high-strength nickel-based superalloys", *Acta Materialia*, 75, pp. 356-370, 2014.

Prager et al., Welding Research Council Bulletin, pp. 128, 1968.

Office Action issued in corresponding Japanese Application No. 2021-572300, dated Apr. 23, 2024 (English Translation provided).

Office Action issued in related U.S. Appl. No. 18/117,828, dated May 7, 2024.

Office Action issued in Corresponding Japanese Application No. 2022-520380, dated Nov. 26, 2024 (English Translation provided).

\* cited by examiner

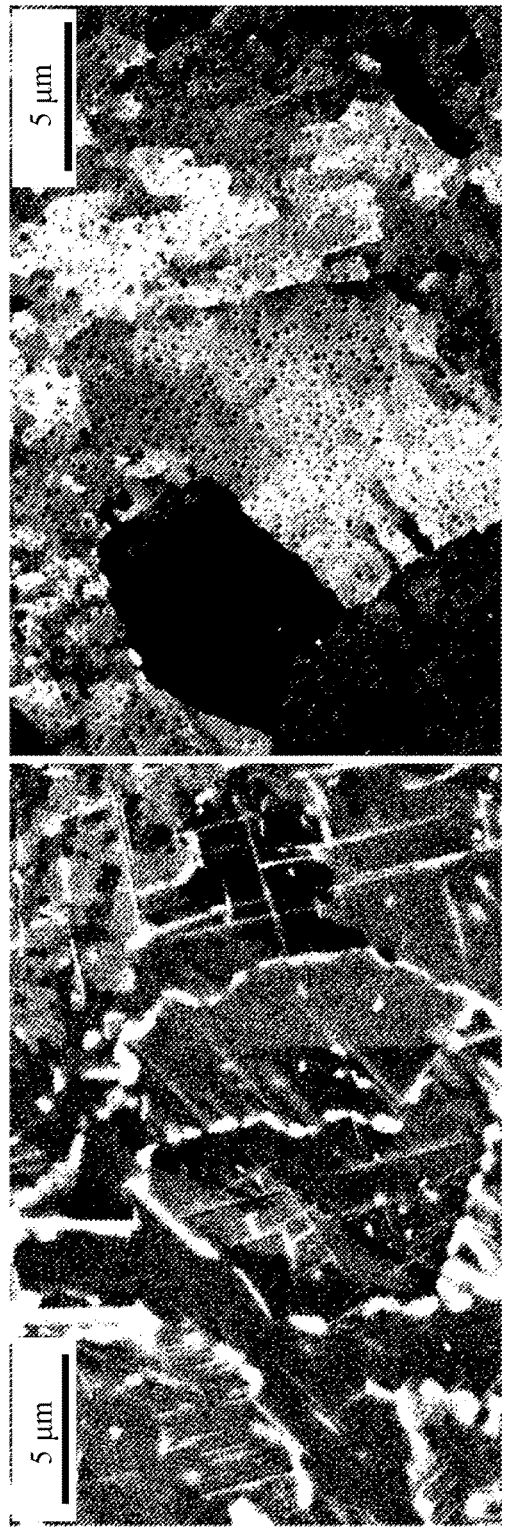
Figure 17: Microstructures after heat treatment of 1000 hours at 760 °C of: Left - example alloy which falls outside the scope of the present invention only due to too much molybdenum of 3.3wt%; Right – ABD-900AM from the present application.

NICKEL-BASED ALLOY

CROSS-REFERENCE TO RELATED APPLICATION

This application is a national phase application under 35 U.S.C. § 371 of International Application No. PCT/GB2020/052349, filed Sep. 29, 2020, which claims priority to and the benefit of United Kingdom Application No. 1914217.3, filed Oct. 2, 2019. The contents of the referenced patent applications are incorporated into the present application by reference.

FIELD OF THE DISCLOSURE

The present invention relates to a nickel-based superalloy composition designed for application in additive manufacturing (AM) processes, examples of such processes including but not limited to, powder-bed based AM methods (e.g. selective laser melting, electron beam melting), direct metal deposition methods (e.g. powder deposition and wire based methods).

BACKGROUND

Currently, there has been a tendency to migrate nickel-based superalloys which have been successfully manufactured in cast form or wrought form to the AM process. However, this has proven largely inappropriate because many of the material characteristic required for ease of processing in the AM process are not fulfilled by such alloys leading to substantial difficulties in processing and resulting in materials which do not have the expected structural integrity.

In particular there has been significant challenge to develop alloys for the additive manufacturing process, with an optimal trade-off between high strength, low density and resistance to hot cracking. Commonly high strength alloys are processed by investment casting method, examples of common alloys used for the investment casting process are listed in Table 1.

The application of the alloys listed in Table 1 for additive manufacturing methods has been widely studied. It has been shown that although the alloys maybe difficult to weld, certain failure mechanisms can be limited. For example, these alloys are susceptible to strain-age cracking. Careful control during the in-process AM conditions (scan strategy, heat input, etc.) and the post-processing conditions (heat treatment window and heating rate) can reduce the risks associated with strain-age cracking. Similarly, strain-age crack resistance can be improved by designing the geometry of the part to reduce the impact of stress-concentrating features such as notches. However, it is still desirable to reduce propensity to strain age cracking in order to give more design freedom in terms of processing conditions and geometry.

Strain-age cracking occurs because of two principal factors: residual strain and $\gamma'$ precipitation. In terms composition, this is sought in the present invention by minimising the content of $\gamma'$-forming elements, within the restrictions imposed by property targets. It is also shown by Illston (U.S. Pat. No. 9,352,421 B2) that residual stress build-up can be minimised through process control, particularly the use of thin powder layers and deliberately overlapping laser scans, hence allowing for improved printability of high-$\gamma'$ superalloys. It is also shown by Etter et al (U.S. Pat. No. 9,670,572 B2) that by ramping up particularly quickly to the post-AM stress-relief heat treatment temperature the risk of strain-age cracking can be reduced.

Another mechanism which cannot be as easily mitigated by optimisation of processing is hot cracking. Hot cracking occurs during the last stages of solidification process with a strong dependence on alloy chemistry.

It is the aim of this invention to develop a creep resistant $\gamma'$-phase strengthened alloy which is resistant to the mechanisms of hot cracking and strain age cracking by tailoring the alloy chemistry to overcome these unwanted damage mechanisms whilst keeping the density of the alloy reasonable and whilst having a competitive strength.

In combination with this improved processability the alloy of the invention preferably has a very high level of oxidation and corrosion resistance. This can be achieved by having a sufficiently high ratio of chromium to titanium to form a stable and continuous protective chromia scale.

TABLE 1

Nominal composition in wt % of conventional chromia-forming superalloys. Nickel is the balance element in all cases.

| Alloy (wt %) | Al | Co | Cr | Fe | Mo | Nb | Ta | Ti | W | C | B | Zr |
|---|---|---|---|---|---|---|---|---|---|---|---|---|
| Haynes 282 | 1.5 | 10 | 20 | 0 | 8.5 | 0 | 0 | 2.1 | 0 | 0.06 | 0.005 | 0 |
| ATI 718+ | 1.45 | 9 | 19 | 9 | 2.8 | 5.5 | 0 | 0.75 | 1.1 | 0.08 | 0.005 | 0 |
| Rene88 DT | 2.1 | 13 | 16 | 0 | 4 | 0.7 | 0 | 3.7 | 4 | 0.04 | 0.015 | 0.05 |
| U720Li | 2.5 | 14.8 | 18 | 0 | 3 | 0 | 0 | 5 | 1.3 | 0.015 | 0.015 | 0.035 |
| IN738LC | 3.4 | 8.5 | 16 | 0 | 1.7 | 0.8 | 1.7 | 3.4 | 2.5 | 0.11 | 0.01 | 0.05 |
| IN792 | 3.2 | 9 | 12.5 | 0 | 1.8 | 0 | 3.9 | 4.2 | 3.9 | 0.21 | 0.02 | 0.1 |

SUMMARY

The present invention provides a nickel-based alloy composition consisting, in weight percent, of: 1.5 to 4.5% aluminium, 1.1 to 3.4% titanium, 0.0 to 4.0% niobium, 0.0 to 5.2% tantalum, 0.9 to 6.6% tungsten, 0.0 to 3.0% molybdenum, 0.0 to 24.0% cobalt, 12.5 to 20.6% chromium, 0.02 to 0.15% carbon, 0.001 to 0.015% boron, 0.0 to 0.1% zirconium, 0.0 to 3.0% rhenium, 0.0 to 2.0% ruthenium, 0.0 to 3.0% iridium, 0.0 to 0.5% vanadium, 0.0 to 1.0% palladium, 0.0 to 1.0% platinum, 0.0 to 0.5% silicon, 0.0 to 0.1% yttrium, 0.0 to 0.1% lanthanum, 0.0 to 0.1% cerium, 0.0 to 0.003% sulphur, 0.0 to 0.25% manganese, 0.0 to 0.1 magnesium, 0.0 to 5.0% iron, 0.0 to 0.5% copper, 0.0 to 1.0% hafnium, the balance being nickel and incidental impurities, wherein the following equations are satisfied in which $W_{Al}$, $W_{Ti}$, $W_{Nb}$, $W_{Ta}$ and $W_W$ are the weight percent of aluminium, titanium, niobium, tantalum and tungsten in the alloy respectively $$0.65 \leq 0.3W_{Nb} + 0.15W_{Ta}$$

$$3.6 \leq W_{Al} + 0.5W_{Ti} + 0.3W_{Nb} + 0.15W_{Ta} \leq 5.7$$

$$W_{Ta} + 0.92W_W \leq 6.1$$

Such an alloy has a good balance of strength, resistance to hot cracking and strain age cracking and reasonable density.

In an embodiment the nickel-based alloy composition according to claim 1, wherein the following equation is satisfied in which $W_{Al}$, $W_{Ti}$ $W_{Nb}$ and $W_{Ta}$ are the weight percent of aluminium, titanium, niobium and tantalum in the alloy respectively $$4.1 \leq W_{Al} + 0.5W_{Ti} 0.3W_{Nb} 0.15W_{Ta}$$

Such an alloy has improved strength.

In an embodiment the nickel-based alloy composition satisfies the following equation in which $W_{Al}$, $W_{Ti}$ $W_{Nb}$ and $W_{Ta}$ are the weight percent of aluminium, titanium, niobium and tantalum in the alloy respectively $$W_{Al} + 0.5W_{Ti} + 0.3W_{Nb} + 0.15W_{Ta} \leq 5.5$$

preferably, $W_{Al} 0.5W_{Ti} + 0.3W_{Nb} 0.15W_{Ta} \leq 5.4$ more preferably, $W_{Al} 0.5W_{Ti} + 0.3W_{Nb} + 0.15W_{Ta} \leq 5.0$ Such an alloy has improved resistance to strain age cracking.

In an embodiment the nickel-based alloy composition comprises a volume fraction of gamma prime phase of 44% or less at 900° C., preferably a volume fraction of gamma prime phase of 40% or less at 900° C., more preferably a volume fraction of gamma prime phase of 35% or less at 900° C. and/or comprises a volume fraction of gamma prime phase of 19% or more at 900° C. Such an alloy has a high creep strength and resistance to stain-age cracking.

In an embodiment the nickel-based alloy composition satisfies the following equation in which $W_W$ and $W_{Mo}$ are the weight percent of tungsten and molybdenum in the alloy respectively $$W_W + 0.77W_{Mo} \geq 3.0$$

preferably $$W_W + 0.77W_{Mo} \geq 4.6$$

more preferably $$W_W + 0.77W_{Mo} \geq 6.2$$

Such an alloy has superior creep resistance.

In an embodiment the nickel-based alloy composition, consists of, in weight percent, 16.0% or more chromium. Such an alloy has superior oxidation resistance.

In an embodiment the nickel-based alloy composition, consists of, in weight percent, 19.5% or less chromium, preferably 19.0% or less chromium, more preferably 17.3% or less chromium. Such an alloy has improved properties against TCP phase formation.

In an embodiment the nickel-based alloy composition consists of, in weight percent, 4.2% or less tantalum. Such an alloy has reduced density.

In an embodiment the nickel-based alloy composition consists of, in weight percent, 2.9% or less molybdenum, preferably 2.5% or less molybdenum. Such an alloy has reduced propensity to deleterious TCP phase precipitation.

In an embodiment the nickel-based alloy composition consists of, in weight percent, 3.0% or less titanium, preferably 2.7% or less titanium. Such an alloy has improved oxidation resistance through improved chromia layer protection.

In an embodiment the nickel-based alloy composition, consists of, in weight percent, 5.5% or less tungsten, preferably 5.0% or less tungsten, more preferably 4.5% or less tungsten, most preferably 3.3% or less tungsten. Such an alloy has lower density.

In an embodiment the nickel-based alloy composition, consists of, in weight percent, 3.0% or less niobium. Such an alloy has improved oxidation resistance.

In an embodiment the nickel-based alloy composition, consists of, in weight percent, 0.5% or less of one or both of platinum and palladium, more preferably 0.1% or less of one or both of platinum and palladium. Such an alloy has improved balance of cost and improvement to corrosion resistance.

In an embodiment the nickel-based alloy composition, consists, in weight percent, 1.7% or more aluminium. This ensures a stable γ' phase.

In an embodiment the nickel-based alloy composition, consists of, in weight percent, 3.9% or less aluminium, preferably of 3.7% or less aluminium, more preferably of 3.1% or less aluminium. Such an alloy has reduced density.

In an embodiment the nickel-based alloy composition, consists of, in weight percent, 20.0% or less cobalt. Such an alloy has reduced freezing range thereby reducing the propensity for hot cracking.

In an embodiment the nickel-based alloy composition according, consists of, in weight percent 0.6% or more tantalum, preferably of 1.0% or more tantalum. Such an alloy has reduced hot cracking propensity.

In an embodiment the nickel-based alloy composition, consists of, in weight percent 1.2% or more tungsten, preferably of 2.3% or more tungsten, more preferably of 2.7% or more tungsten. Such an alloy has improved creep resistance.

In an embodiment the nickel-based alloy composition, consists of, in weight percent 5.0% or more cobalt, preferably of 10.0% or more cobalt. Such an alloy has higher intermediate-temperature creep resistance and thermal conductivity.

In an embodiment the nickel-based alloy composition, consists of, in weight percent 0.6% or more niobium, preferably of 1.2% or more niobium, more preferably 1.60% or more niobium, yet more preferably 1.65% or more niobium. Such an alloy achieves better hot cracking resistance without impacting density.

In an embodiment the nickel-based alloy composition, consists of, in weight percent 3.8 wt % or less iron, preferably of 2.0% or less iron. This reduces the propensity to form Laves phase.

In an embodiment the nickel-based alloy composition satisfies the following equation in which $W_W$, $W_{Mo}$ and $W_{Cr}$ are the weight percent of tungsten, molybdenum and chromium respectively $$W_W 0.74W_{Mo} + 0.93W_{Cr} \leq 22.1$$

preferably $$W_W + 0.74W_{Mo} + 0.93W_{Cr} \leq 21.5$$

Such an alloy has improved stability against TCP phase formation.

In an embodiment the nickel-based alloy composition satisfies the following equation in which $W_{Nb}$, $W_{Ta}$, $W_{Ti}$, and $W_{Al}$ are the weight percent of niobium, tantalum, titanium, and aluminium, respectively $$\frac{0.5W_{Ti} + 0.3W_{Nb} + 0.15W_{Ta}}{W_{Al}} \leq 1.5$$

Such an alloy has improved γ′ stability.

In an embodiment the nickel-based alloy composition satisfies the following equation in which $W_{Cr}$, and $W_{Ti}$, are the weight percent of chromium and titanium, respectively $$\frac{W_{Cr}}{W_{Ti}} \geq 6.0$$

preferably $$\frac{W_{Cr}}{W_{Ti}} \geq 6.9$$

more preferably $$\frac{W_{Cr}}{W_{Ti}} \geq 7.5$$

Such an alloy has superior oxidation resistance.

In an embodiment the nickel-based alloy composition satisfies the following equation is satisfied in which $W_{Ta}$, and $W_W$ are the weight percent of tantalum and tungsten, respectively $$W_{Ta} + 0.92W_W \leq 5.4$$

preferably $$W_{Ta} + 0.92W_W \leq 5.1$$

more preferably $$W_{Ta} + 0.92W_W \leq 4.8$$

even more preferably $$W_{Ta} 0.92W_W \leq 4.0$$

Such an alloy has reduced density.

In an embodiment the nickel-based composition satisfies the following equation in which $W_{Nb}$ and $W_{Ta}$ are the weight percent of niobium and tantalum, respectively $$0.68 \leq 0.3W_{Nb} + 0.15W_{Ta}$$

preferably $$0.75 \leq 0.3W_{Nb} + 0.15W_{Ta}$$

more preferably $$1.15 \leq 0.3W_{Nb} + 0.15W_{Ta}$$

Such an alloy has improved resistance to hot cracking.

BRIEF DESCRIPTION OF THE DRAWINGS

FIG. 17 shows micrographs after heat treatment at 760° C. for 1000 hours showing the effect of elevated molybdenum content on TCP phase content.

DETAILED DESCRIPTION OF THE INVENTION

Figure 1:
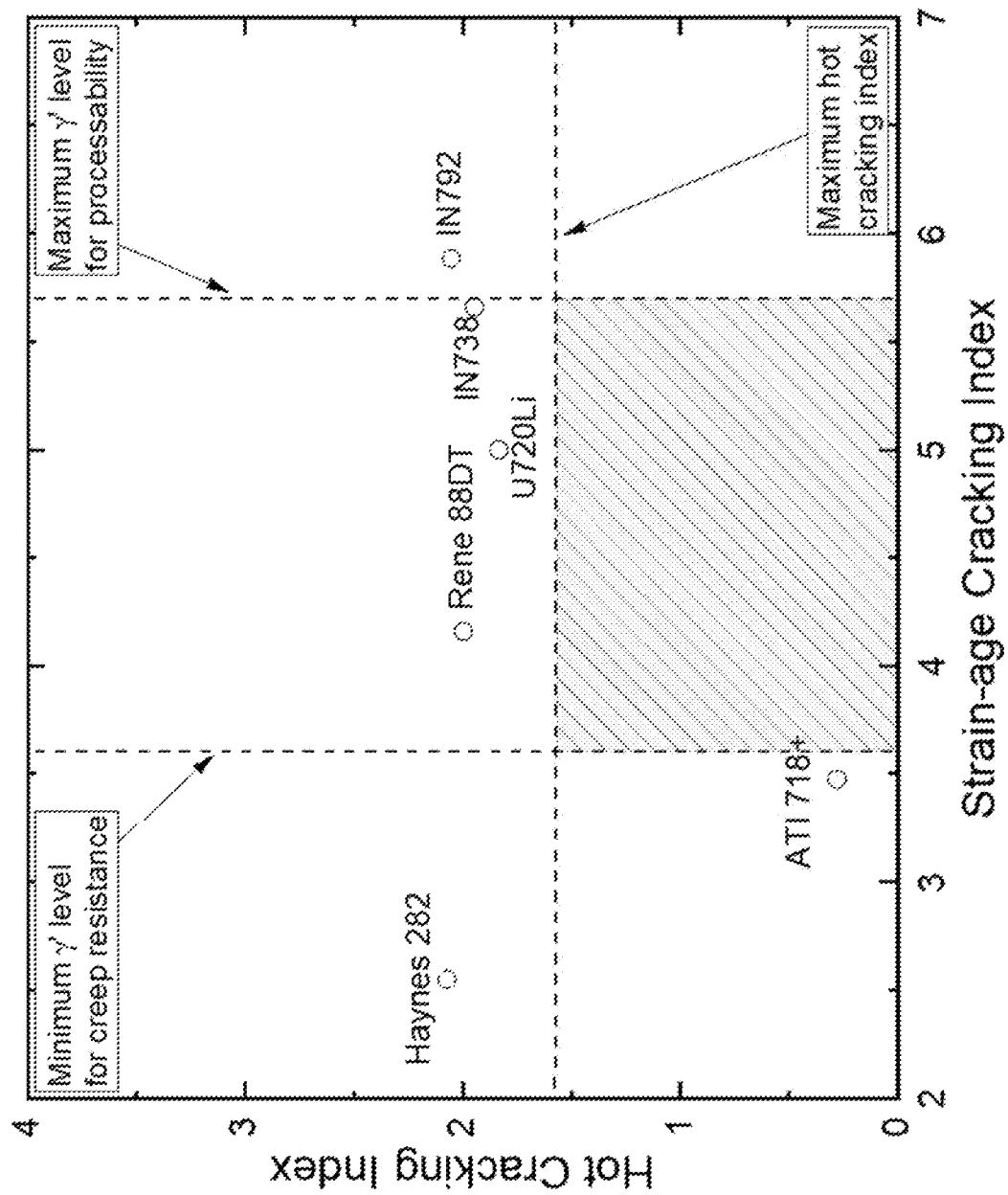
FIG. 1 shows the calculated values for strain-age cracking index and hot cracking index for a number of commercially used chromia forming superalloys (including alloys listed in Table 1), limits for creep resistance, stain age cracking and hot cracking are identified, the target area for the invention is shaded.
Figure 2:
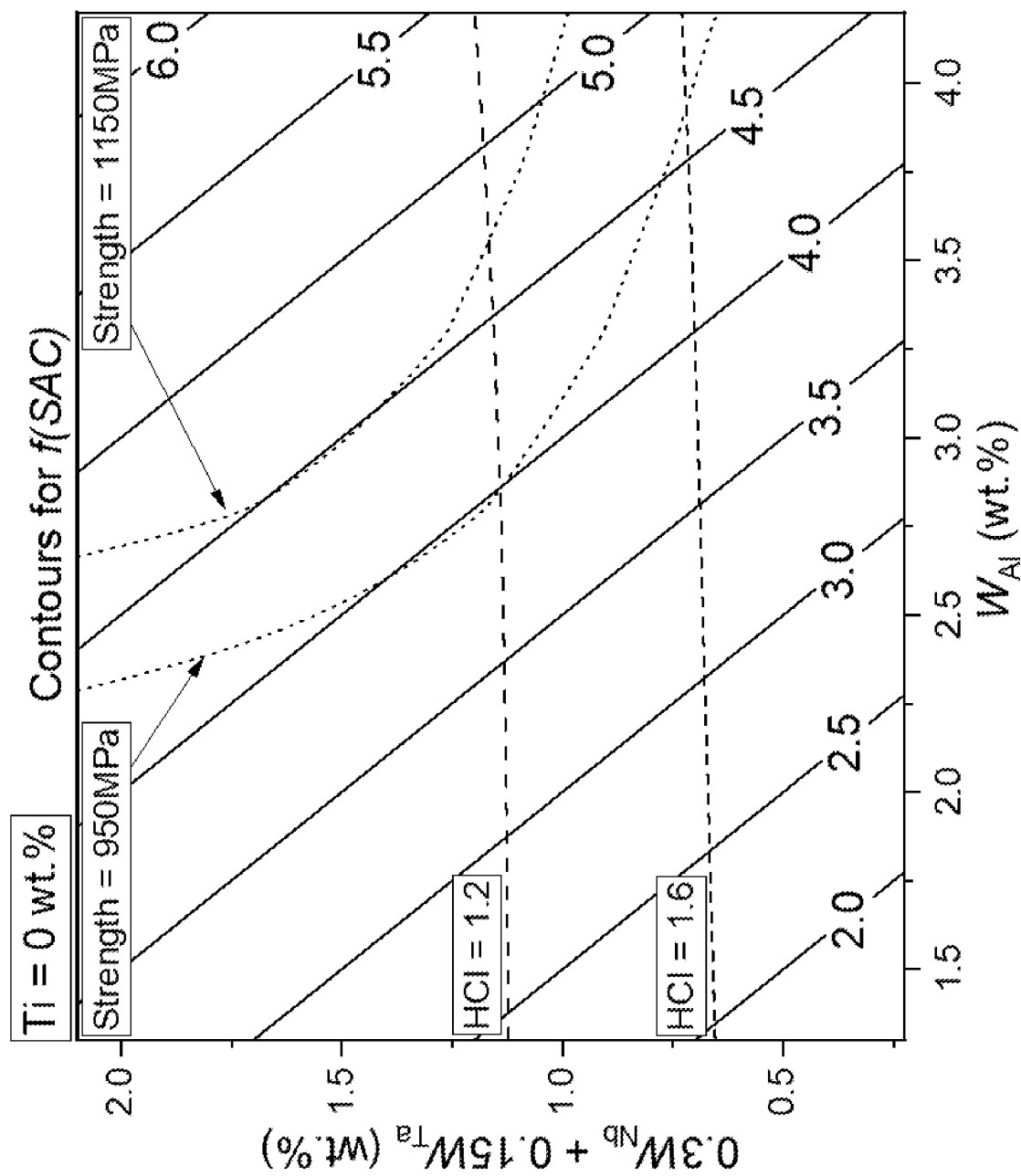
FIG. 2 shows contour lines of strain-age cracking index as for a fixed titanium level of 0.0 wt. %: Overlaid are contour lines of the desired hot cracking index (1.6) and the most preferable hot cracking index (1.2), and the line with the desired strengths of 950 MPa and 1150 MPa.
Figure 3:
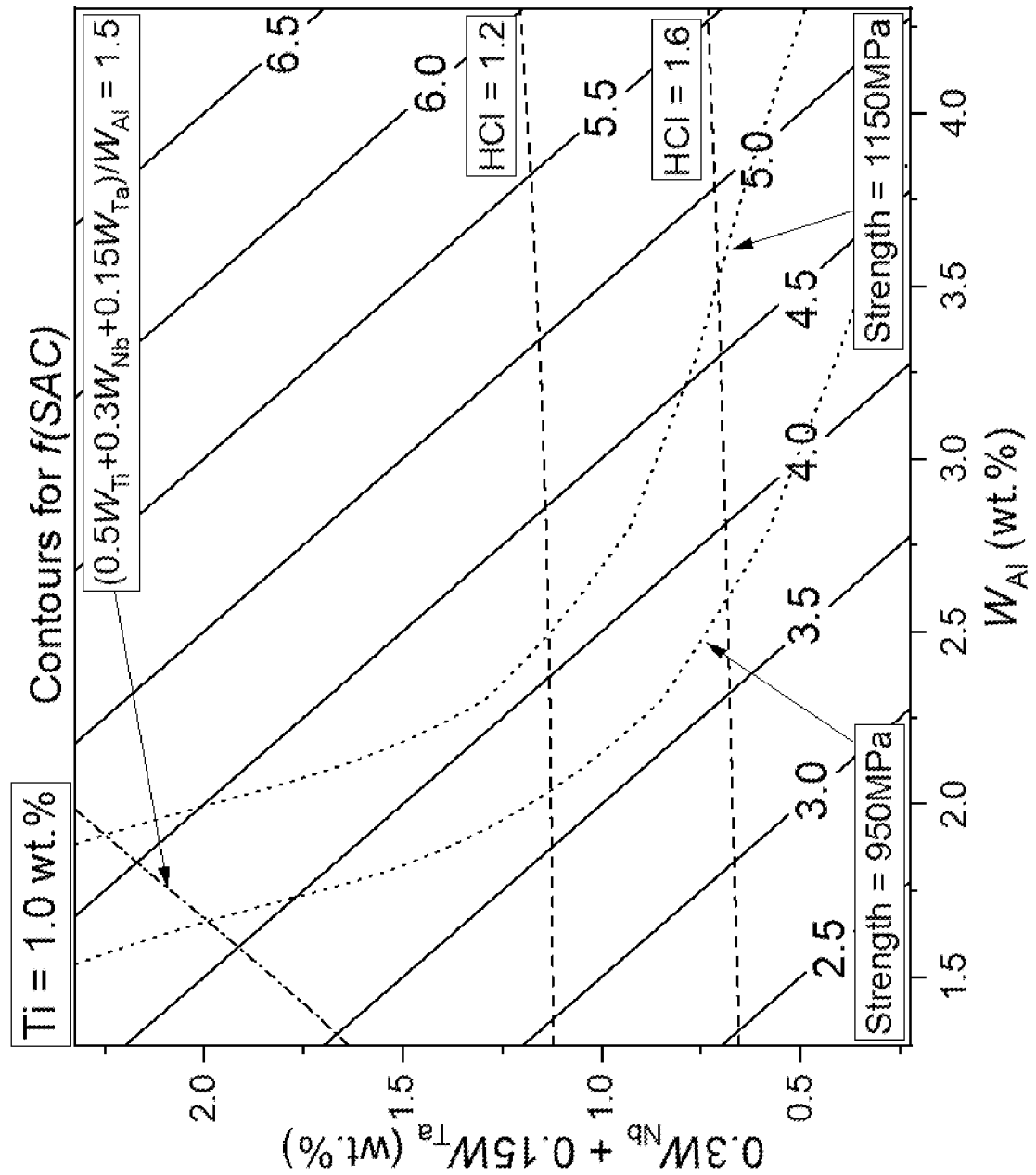
FIG. 3 shows contour lines of strain-age cracking index as for a fixed titanium level of 1.0 wt. %. Overlaid are contour lines of the desired hot cracking index (1.6) and the most preferable hot cracking index (1.2), and the line with the desired strengths of 950 MPa and 1150 MPa and the γ′ phase stability to the right of the graph.
Figure 4:
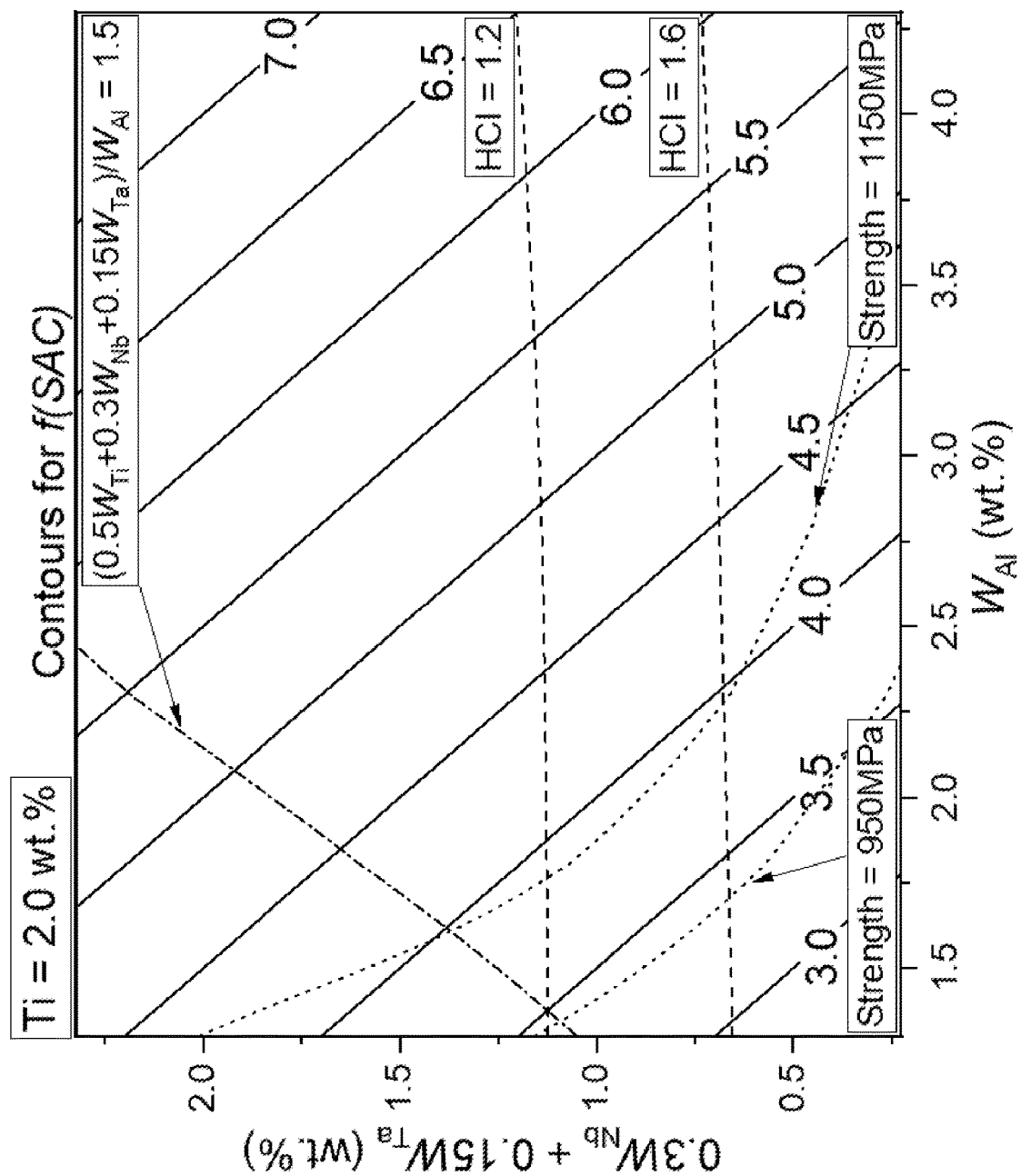
FIG. 4 shows contour lines of strain-age cracking index as for a fixed titanium level of 2.0 wt. %. Overlaid are contour lines of the desired hot cracking index (1.6) and the most preferable hot cracking index (1.2), and the line with the desired strength of 950 MPa and 1150 MPa and the γ′ phase stability to the right of the line.
Figure 5:
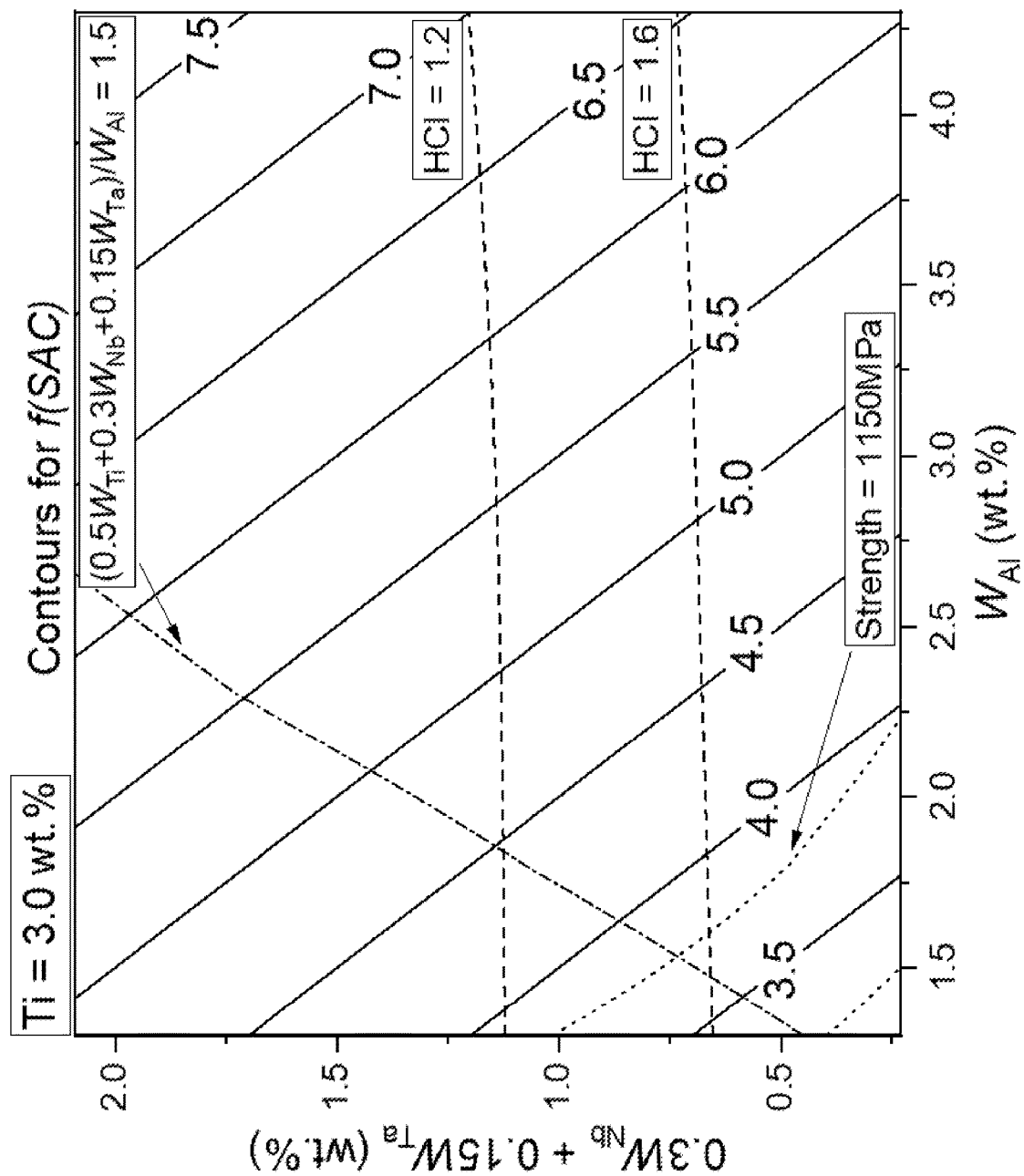
FIG. 5 shows contour lines of strain-age cracking index as for a fixed titanium level of 3.0 wt. %. Overlaid are contour lines of the desired hot cracking index (1.6) and the most preferable hot cracking index (1.2), and the line with the desired strengths of 950 MPa and 1150 MPa and the γ′ phase stability to the right of the line.
Figure 6:
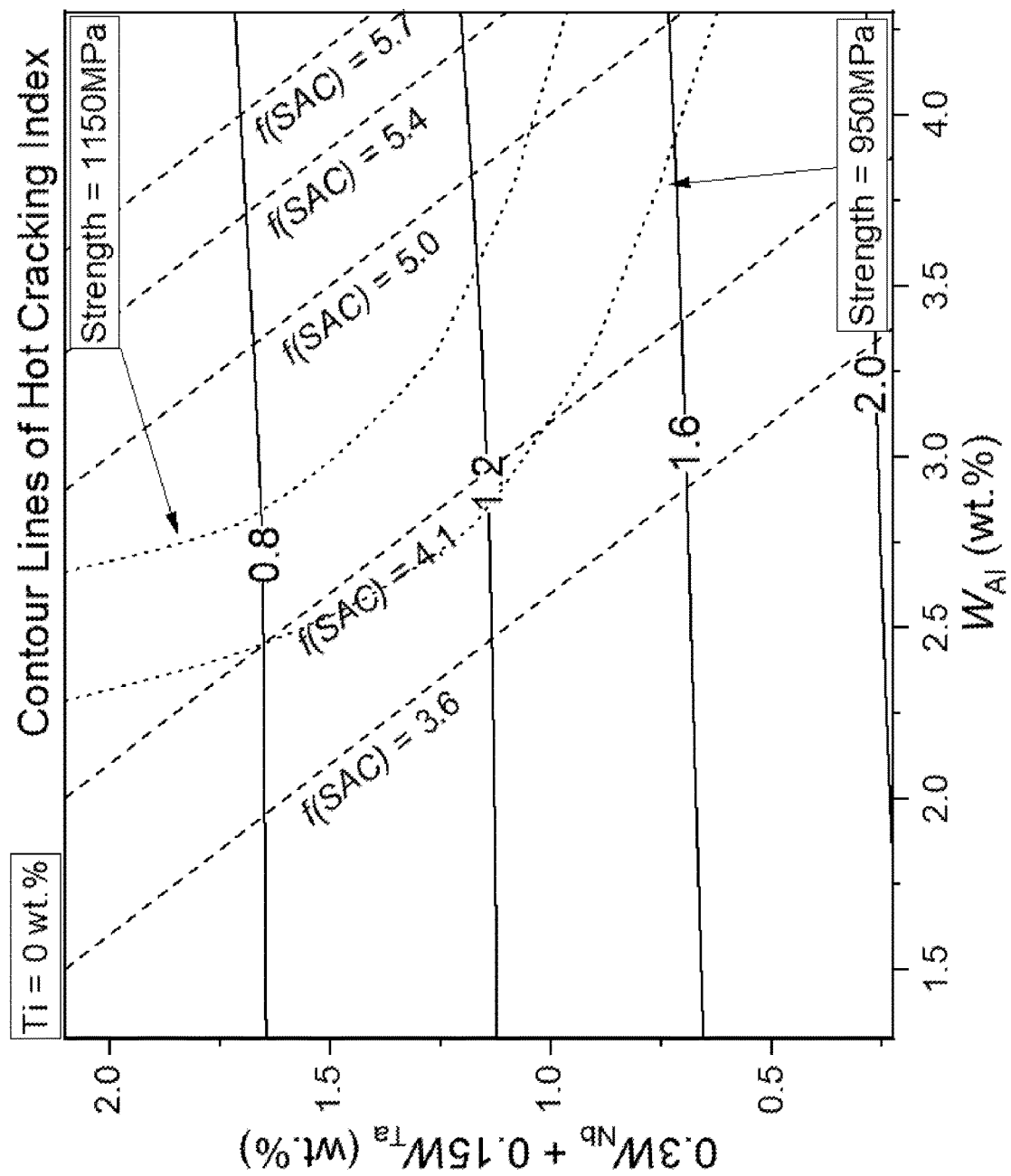
FIG. 6 shows contour lines of constant hot cracking index at Ti=0.0 wt. %. Superimposed are the preferred limits for strain-age cracking index and desired strengths of 950 MPa and 1150 MPa.
Figure 7:
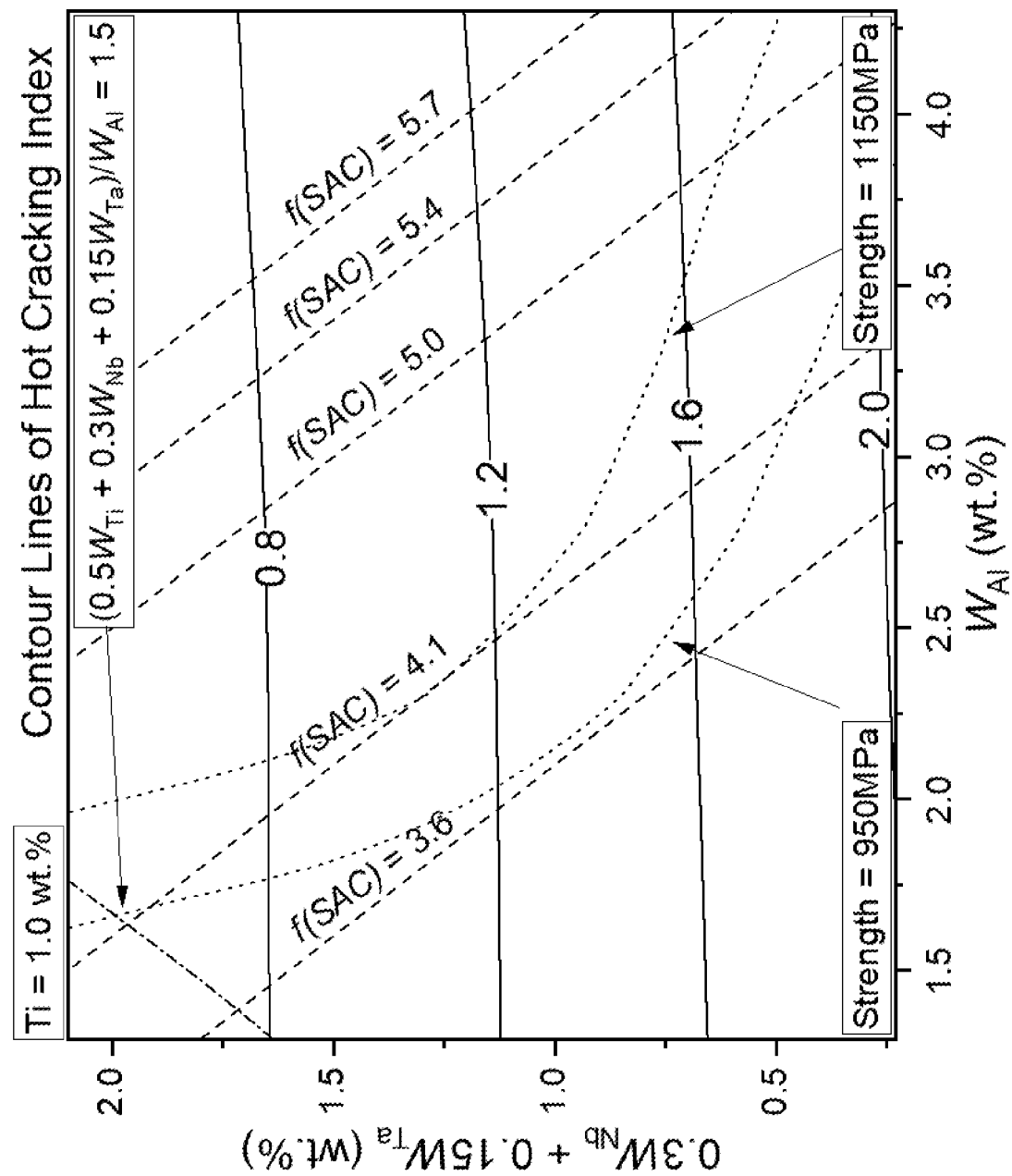
FIG. 7 shows contour lines of constant hot cracking index at Ti=1.0 wt. %. Superimposed are the preferred limits for strain-age cracking index and desired strength of 950 MPa and 1150 MPa and the γ′ phase stability.
Figure 8:
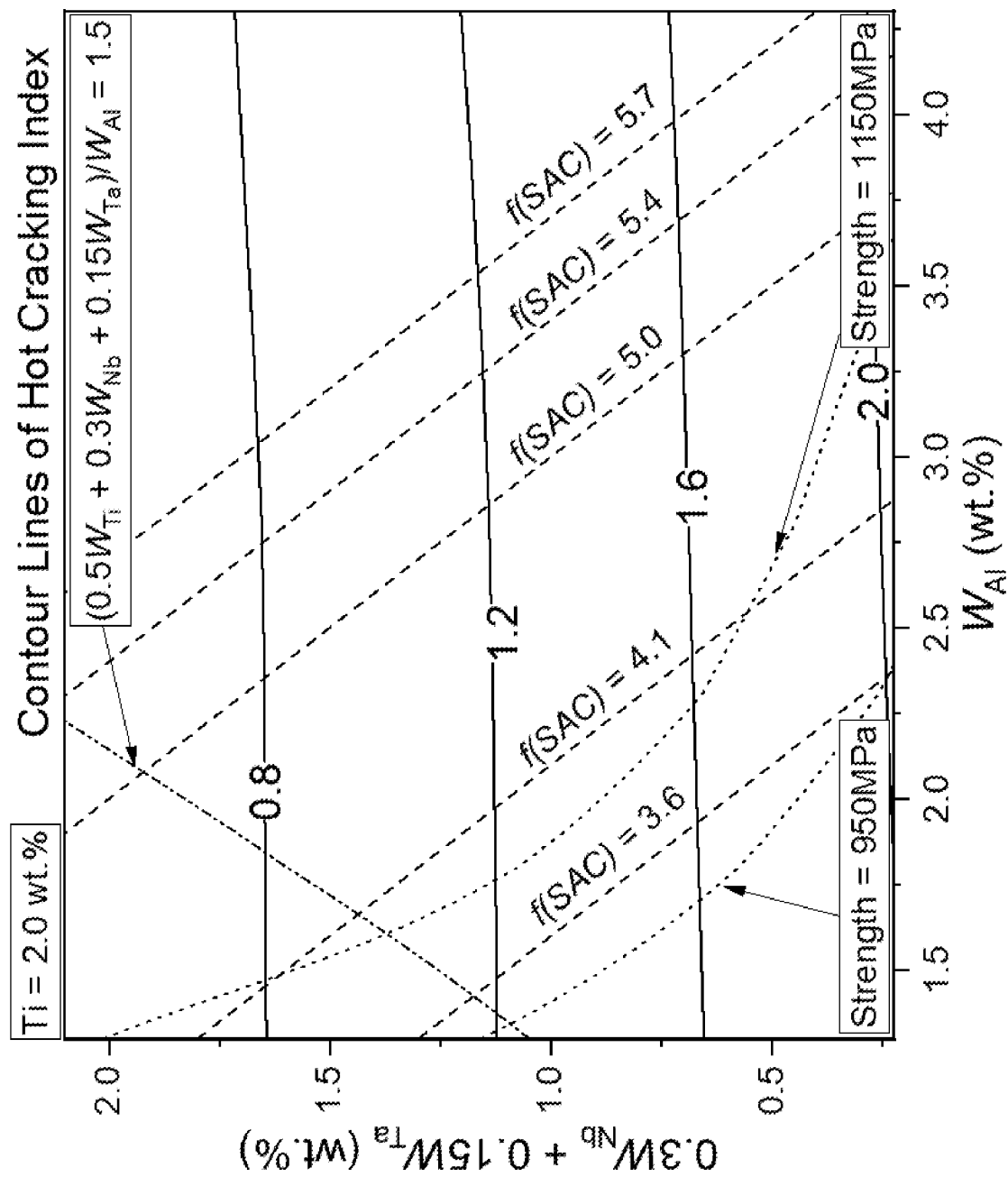
FIG. 8 shows contour lines of constant hot cracking index at Ti=2.0 wt. %. Superimposed are the preferred limits for strain-age cracking index and desired strength of 950 MPa and 1150 MPa and the γ′ phase stability.
Figure 9:
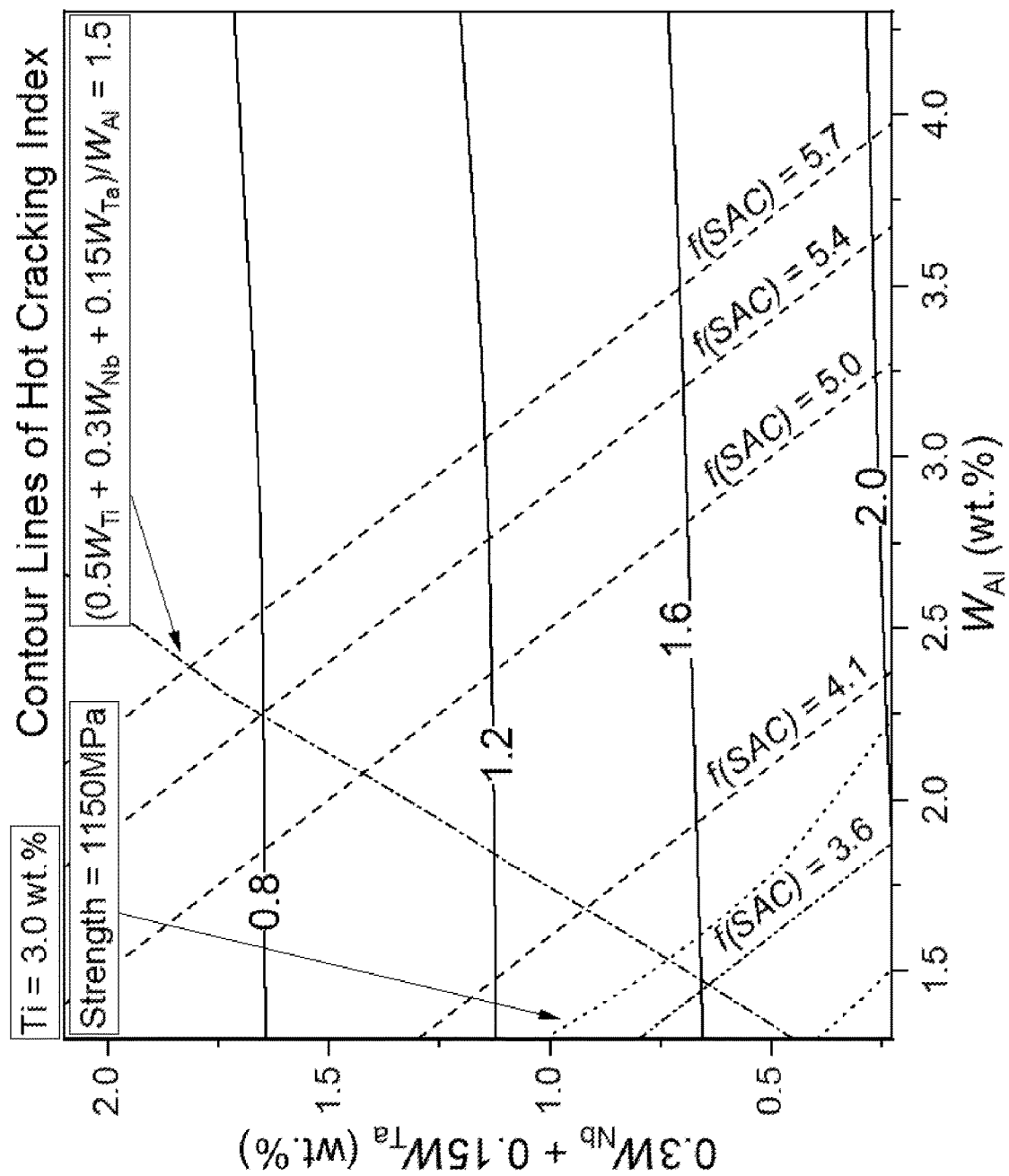
FIG. 9 shows contour lines of constant hot cracking index at Ti=3.0 wt. %. Superimposed are the preferred limits for strain-age cracking index and desired strength of 950 MPa and 1150 MPa and the γ′ phase stability.

Traditionally, nickel-based superalloys have been designed through empiricism. Thus their chemical compositions have been isolated using time consuming and expensive experimental development, involving small-scale processing of limited quantities of material and subsequent characterisation of their behaviour. The alloy composition adopted is then the one found to display the best, or most desirable, combination of properties. The large number of possible alloying elements indicates that these alloys are not entirely optimised and that improved alloys are likely to exist.

In superalloys, generally additions of chromium (Cr) and aluminium (Al) are added to impart resistance to oxidation/corrosion, cobalt (Co) is added to improve resistance to sulphidisation. For creep resistance, molybdenum (Mo), tungsten (W), cobalt are introduced, because these retard the thermally-activated processes—such as, dislocation climb—which determine the rate of creep deformation. To promote static and cyclic strength, aluminium (Al), tantalum (Ta), niobium (Nb) and titanium (Ti) are introduced as these promote the formation of the precipitate hardening phase gamma-prime ($\gamma'$). This precipitate phase is coherent with the face-centred cubic (FCC) matrix phase which is referred to as gamma ($\gamma$).

A modelling-based approach used for the isolation of new grades of nickel-based superalloys is described here, termed the "Alloys-by-Design" (ABD) method. This approach utilises a framework of computational materials models to estimate design relevant properties across a very broad compositional space. In principle, this alloy design tool allows the so-called inverse problem to be solved; identifying optimum alloy compositions that best satisfy a specified set of design constraints.

The first step in the design process is the definition of an elemental list along with the associated upper and lower compositional limits. The compositional limits for each of the elemental additions considered in this invention—referred to as the "alloy design space"—are detailed in Table 2.

TABLE 2

Alloys design space in wt % searched using the "Alloys-by-Design" method.

| Alloy (wt. %) | Al | Co | Cr | Mo | Nb | Ta | Ti | W |
|---|---|---|---|---|---|---|---|---|
| Min | 0.0 | 0.0 | 6.0 | 0.0 | 0.0 | 0.0 | 0.0 | 0.0 |
| Max | 10.0 | 25.0 | 25.0 | 8.0 | 8.0 | 8.0 | 8.0 | 8.0 |

The balance is nickel. The levels of carbon, boron and zirconium where fixed at 0.04%, 0.005% and 0.01% respectively.

The second step relies upon thermodynamic calculations used to calculate the phase diagram and thermodynamic properties for a specific alloy composition. Often this is referred to as the CALPHAD method (CALculation of PHAse Diagrams). These calculations are conducted at the typical service temperature for the new alloy (900° C.), providing information about the phase equilibrium (microstructure).

A third stage involves isolating alloy compositions which have the desired microstructural architecture. In the case of nickel-based superalloys which require superior resistance to creep deformation, the creep rupture life generally improves as the volume fraction of the precipitate hardening phase $\gamma'$ is increased, the most beneficial range for volume fraction of $\gamma'$ lies between 60%-70%. Such high levels of $\gamma'$ may be detrimental to alloy processability, and so may need to be lower in some cases in order to manage this trade-off. At values above 70% volume fraction of $\gamma'$ a reduction in creep resistance is observed.

It is also necessary that the $\gamma/\gamma'$ lattice misfit should conform to a small value, either positive or negative, since coherency is otherwise lost; thus limits are placed on its magnitude. The lattice misfit $\delta$ is defined as the mismatch between $\gamma$ and $\gamma'$ phases, and is determined according to $$\delta = \frac{2(a_{\gamma'} - a_\gamma)}{a_{\gamma'} + a_\gamma} \qquad (1)$$

where $a_\gamma$ and $a_{\gamma'}$ are the lattice parameters of the $\gamma$ and $\gamma'$ phases.

Rejection of alloy on the basis of unsuitable microstructural architecture is also made from estimates of susceptibility to topologically close-packed (TCP) phases. The present calculations predict the formation of the deleterious TCP phases sigma ($\sigma$), P and mu ($\mu$) using CALPHAD modelling.

Thus the model isolates all compositions in the design space which are calculated to result in a desired volume fraction of $\gamma'$, which have a lattice misfit $\gamma'$ of less than a predetermined magnitude and have a total volume fraction of TCP phases below a predetermined magnitude.

In the fourth stage, merit indices are estimated for the remaining isolated alloy compositions in the dataset. Examples of these include: creep-merit index (which describes an alloy's creep resistance based solely on mean composition), strength-merit index (which describes an alloy's precipitation yield strength based solely on mean composition), solid-solution merit index (which describes an alloy's solid solution yield strength based solely on mean composition), density and cost.

In the fifth stage, the calculated merit indices are compared with limits for required behaviour, these design constraints are considered to be the boundary conditions to the problem. All compositions which do not fulfil the boundary conditions are excluded. At this stage, the trial dataset will be reduced in size quite markedly.

The final, sixth stage involves analysing the dataset of remaining compositions. This can be done in various ways. One can sort through the database for alloys which exhibit maximal values of the merit indices—the lightest, the most creep resistant, the most oxidation resistant, and the cheapest for example. Or alternatively, one can use the database to determine the relative trade-offs in performance which arise from different combination of properties.

The example seven merit indices are now described.

The first merit index is the creep merit index. The overarching observation is that time-dependent deformation (i.e. creep) of a nickel-based superalloy occurs by dislocation creep with the initial activity being restricted to the $\gamma$ phase. Thus, because the fraction of the $\gamma'$ phase is large, dislocation segments rapidly become pinned at the $\gamma/\gamma'$ interfaces. The rate-controlling step is then the escape of trapped configurations of dislocations from $\gamma/\gamma'$ interfaces, and it is the dependence of this on local chemistry—in this case composition of the $\gamma$ phase—which gives rise to a significant influence of alloy composition on creep properties.

A physically-based microstructure model can be invoked for the rate of accumulation of creep strain $\dot{\varepsilon}$ when loading is uniaxial and along the $\langle 001 \rangle$ crystallographic direction. The equation set is $$\dot{\varepsilon}_{\langle 001 \rangle} = \frac{16}{\sqrt{6}} \rho_m \phi_p D_{eff}(1-\phi_p)(1/\phi_p^{1/3} - 1)\sinh\left\{\frac{\sigma b^2 \omega}{\sqrt{6} K_{CF} kT}\right\} \quad (2)$$

$$\dot{\rho}_m = C\dot{\varepsilon}_{\langle 001 \rangle} \quad (3)$$

where $\rho_m$ is the mobile dislocation density, $\phi_p$ is the volume fraction of the $\gamma'$ phase, and $\omega$ is width of the matrix channels. The terms $\sigma$ and T are the applied stress and temperature, respectively. The terms b and k are the Burgers vector and Boltzmann constant, respectively. The term $K_{CF}=1+2\phi_p^{1/3}/3\sqrt{3\pi}(1-\phi_p^{1/3})$ is a constraint factor, which accounts for the close proximity of the cuboidal particles in these alloys. Equation 3 describes the dislocation multiplication process which needs an estimate of the multiplication parameter C and the initial dislocation density. The term $D_{eff}$ is the effective diffusivity controlling the climb processes at the particle/matrix interfaces.

Note that in the above, the composition dependence arises from the two terms $\phi_p$ and $D_{eff}$. Thus, provided that the microstructural architecture is assumed constant (microstructural architecture is mostly controlled by heat treatment) so that $\phi_p$ is fixed, any dependence upon chemical composition arises through $D_{eff}$. For the purposes of the alloy design modelling described here, it turns out to be unnecessary to implement a full integration of Equations 2 and 3 for each prototype alloy composition. Instead, a first order merit index $M_{creep}$ is employed which needs to be maximised, which is given by $$M_{creep} = \sum_i x_i / \tilde{D}_i \quad (4)$$

where $x_i$ is the atomic fraction of solute i in the $\gamma$ phase and $\tilde{D}_i$ is the appropriate interdiffusion coefficient.

The second merit index is for strength merit index. For high nickel-based superalloys, the vast majority of strength comes from the precipitate phase. Therefore, optimising alloy composition for maximal precipitate strengthening is a critical design consideration. From hardening theory, a merit index for strength, $M_{strength}$, is proposed. The index considers the maximum possible precipitate strength—determined to be the point where the transition from weakly coupled to strongly coupled dislocation shearing occurs—which can be approximated using, $$M_{strength} = \overline{M} \cdot \frac{1}{2}\gamma_{APB}\phi_p^{1/2}/b \quad (5)$$

Where $\overline{M}$ is the Taylor factor, $\gamma_{APB}$ is the anti-phase boundary (APB) energy, $\phi_p$ is the volume fraction of the $\gamma'$ phase and b is the Burgers vector.

From Equation 5 it is apparent that fault energies in the $\gamma'$ phase—for example, the anti-phase boundary APB energy—have a significant influence on the deformation behaviour of nickel-based superalloys. Increasing the APB energy has been found to improve mechanical properties including, tensile strength and resistance to creep deformation. The APB energy was studied for a number of Ni—Al—X systems using density functional theory. From this work the effect of ternary elements on the APB energy of the $\gamma'$ phase was calculated, linear superposition of the effect for each ternary addition was assumed when considering complex multicomponent systems, resulting in the following equation, $$\gamma_{APB}=195-1.7x_{Cr}-1.7x_{Mo}+4.6x_W+27.1x_{Ta}+21.4x_{Nb}+15x_{Ti} \quad (6)$$

where, $x_{Cr}$, $x_{mo}$, $x_W$, $x_{Ta}$, $x_{Nb}$ and $x_{Ti}$ represent the concentrations, in atomic percent, of chromium, molybdenum, tungsten, tantalum, niobium and titanium in the $\gamma'$ phase, respectively. The composition of the $\gamma'$ phase is determined from phase equilibrium calculations.

The third merit index is density. The density, $\rho$, was calculated using a simple rule of mixtures and a correctional factor, where, $\rho_i$ is the density for a given element and $x_i$ is the atomic fraction of the alloy element.

$$\rho=1.05[\Sigma_i x_i \rho_i] \quad (7)$$

The fourth merit index was cost. In order to estimate the cost of each alloy a simple rule of mixtures was applied, where the weight fraction of the alloy element, $x_i$, was multiplied by the current (2016) raw material cost for the alloying element, $c_i$.

$$Cost=\Sigma_i x_i c_i \quad (8)$$

The estimates assume that processing costs are identical for all alloys, i.e. that the product yield is not affected by composition.

A fifth merit index is based upon rejection of candidate alloys on the basis of unsuitable microstructural architecture made on the basis of susceptibility to TCP phases. To do this use is made of the d-orbital energy levels of the alloying elements (referred as Md) to determine the total effective Md level according to $$\overline{M_d}=\Sigma_i x_i Md_i \quad (9)$$

where the $x_i$ represents the mole fraction of the element i in the alloy. Higher values of Md are indicative of higher probability of TCP formation.

The sixth merit index is a strain-age cracking susceptibility index. The fraction of $\gamma'$ in an alloy is related to the chemical composition, most directly to the amounts of the γ′-forming elements: aluminium, titanium, niobium and tantalum. In turn a higher fraction of γ′ leads to a greater risk of strain-age cracking during thermal post-processing. This index is derived by summing the weight percent of each element, with correcting factors for the heavier elements to account for their greater atomic mass relative to that of aluminium. This index is applied via the following equation.

achieved by having an improved resistance to the mechanism of hot cracking. In addition, properties including microstructural stability and alloy density are optimised.

The material properties—determined using the ABD method—for the typical compositions, listed in Table 1, are listed in Table 3. The design of the new alloy was considered in relation to the predicted properties listed for these alloys.

TABLE 3

Calculated phase fractions and merit indices made with the "Alloys-by-Design" software. Results for nickel-based superalloys listed in Table 1.

| Alloy | γ′ | Creep Merit Index ($m^{-2}s \times 10^{-15}$) | Strength Merit Index (MPa) | Density (g/cm³) | Cr/Ti Ratio | Md (eV) | Strain Age Index | Hot Cracking Index | Freezing Range (° C.) | Cost $/Kg |
|---|---|---|---|---|---|---|---|---|---|---|
| IN738 | 0.45 | 5.9 | 1498 | 8.3 | 4.7 | 0.92 | 5.6 | 1.9 | 217 | 5.43 |
| IN792 | 0.51 | 6.4 | 1701 | 8.5 | 3.0 | 0.92 | 5.9 | 2.1 | 226 | 7.46 |
| Rene 88DT | 0.32 | 6.4 | 1368 | 8.5 | 4.3 | 0.92 | 4.2 | 2.0 | 231 | 5.13 |
| U720Li | 0.41 | 5.9 | 1524 | 8.2 | 3.6 | 0.92 | 5.0 | 1.8 | 207 | 4.75 |
| Haynes 282 | 0.12 | 5.9 | 809 | 8.6 | 9.5 | 0.92 | 2.6 | 2.1 | 189 | 4.80 |
| ATI 718+ | 0.09 | 4.3 | 834 | 8.6 | 25.3 | 0.92 | 3.5 | 0.3 | 128 | 5.64 |

$$M_{SAC}=(W_{Al}+0.5W_{Ti}+0.3W_{Nb}+0.15W_{Ta}) \quad (10)$$

where $W_{Al}$, $W_{Ti}$, $W_{Nb}$, and $W_{Ta}$ the weight percent of aluminium, titanium, niobium and tantalum in the alloy by weight percent. A lower value of this strain age index indicates a smaller potential fraction of γ′, and hence better processability by additive manufacturing due to a lower risk of strain-age cracking. A higher value indicates a greater potential fraction of γ′, and hence superior mechanical properties in terms of strength and creep resistance.

A seventh merit index is based on the solidification behaviour of candidate alloys as predicted by the Scheil-Gulliver model, in order to rank susceptibility to hot cracking based on composition. In this approach the temperature range of the terminal stage of solidification, between 90% and 99% fraction solid, is taken to represent the region where an alloy is vulnerable to hot cracking, as it is in this phase that liquid feeding is likely to be restricted by bridged networks of solid material. The temperature range of 40% to 90% of solid fraction is considered to be the safe region, since liquid feeding is far less restricted in this stage; the temperature range before 40% fraction solid is not considered to be relevant because liquid is still the predominant phase.

According to the ranking system used by Clyne and Davis for alloy castings, the hot cracking index is defined as the ratio of the vulnerable temperature range to the safe temperature range, as follows:

$$HCI = \frac{T_{90} - T_{99}}{T_{40} - T_{90}} \quad (11)$$

Lower values of this index correspond to a lower risk of hot cracking.

The ABD method described above was used to isolate the inventive alloy composition. The design intent for this alloy is to develop an alloy with excellent resistance to creep and oxidation—achieved by having a high volume fraction of γ′ and a stable protective chromia scale respectively—combined with improved processability by additive manufacturing compared to other prior art nickel-based superalloys—

The rationale for the design of the new alloy is now described.

Alloys with a high strain-age cracking index are known from welding literature to be difficult to process, and the same trends are generally observed in AM. Reducing the strain-age merit index lowers the propensity to this failure mechanism, however, high-temperature strength (in terms of creep strength and tensile strength) and oxidation resistance (in terms of protective oxide scale formed) are dependent on a relatively high content of γ′-forming elements which makes avoiding a high strain-age index difficult. To overcome this strain-age cracking can be managed to a certain extent in other ways. For example, carefully controlling the in-process AM conditions (scan strategy, heat input, etc.) and the post-processing conditions (heat treatment window and heating rate) can limit the risks associated with strain-age cracking. Similarly, the risk of strain-age crack can be reduced by designing the geometry of the components in way which reduces stress-concentrating features that result in localised strain age cracking. See for example U.S. Pat. Nos. 9,352,421 B2 and 9,670,572 B2. However, it may not be desirable to have to take such measures.

Unlike strain age cracking another manufacturing defect which can arise during the additive manufacturing process is hot cracking. Hot cracking may happen during the solidification process. The mechanism of this manufacturing defect is driven by changes in liquid composition during solidification of the alloy. The risk of hot cracking occurring cannot be managed in the same way as strain age cracking. Carefully controlling the in-process AM conditions may help to some degree, however, the use of post processing or design changes will not influence this mechanism. The most direct way to improve resistance to hot cracking is by modification of alloy chemistry. Improving the resistance to hot cracking substantially improves the processability of an alloy for additive manufacturing even when a high strain-age cracking index must be tolerated. It is the aim of this invention to isolate alloys which have low values of hot cracking index relative to other alloys and which have a relatively high strain age index in a range in which strain-age cracking can be managed by processing conditions, see FIG. 1.

FIGS. 2 to 5 describes the relationship between the addition of elements aluminium, niobium, and tantalum for different levels of titanium. These elements are predominantly added to form the γ' phase and control the volume fraction of γ'.

The elements which form the γ' phase may reduce the ease by which an alloy can be processed by AM due to an increasing strain age merit index (Equation 10). Thus the combination of these elements must be optimised to provide the desired balance between limiting likelihood of strain age cracking during AM processing and volume fraction of γ' (which provides strength in terms of creep resistance and tensile strength).

The strain age cracking index $f(SAC)$ is modelled in the elemental range of the invention based on elements most strongly affecting stain age cracking, namely the aluminium, titanium, niobium and tantalum contents in the following constraint:

$$f(SAC)=W_{Al}+0.5W_{Ti}+0.3W_{Nb}+0.15W_{Ta}$$

where, $f(SAC)$ is a numerical value and $W_{Al}$, $W_{Ti}$, $W_{Nb}$ and $W_{Ta}$ are the weight percent of aluminium, titanium, niobium and tantalum in the alloy respectively. A value of 5.7 or less for $f(SAC)$ is selected as being equivalent to or superior to IN738 in terms of strain-age cracking resistance. It is preferable to lower the strain-age cracking index to improve the processing and post-processing of an alloy, so preferably $W_{Al}+0.5W_{Ti}0.3W_{Nb}+0.15W_{Ta} \le 5.5$ or 5.4 and even more preferably $W_{Al}+0.5W_{Ti}+0.3W_{Nb}+0.15W_{Ta} \le 5.0$. Dotted lines depicting the different limits for strain age cracking are shown in FIGS. 6 to 9.

The combination of aluminium, titanium niobium and tantalum must also be optimised to provide the desired creep resistance and tensile strength, both of which increase as γ' fraction is increased. To achieve the desired volume fraction of the γ'-phase at 900° C. of 19%, $W_{Al}+0.5W_{Ti}+0.3W_{Nb}+0.15W_{Ta}$ is ≥3.6. This limit is defined based on a required minimum level of creep resistance (described later in relation to FIG. 10). In addition, it is preferred to have a γ' fraction of 26% or greater, resulting in preferred values of $W_{Al}+0.5W_{Ti}+0.3W_{Nb}+0.15W_{Ta}$ of ≥4.1 or more.

If $f(SAC)$ is a numerical value which ranges between 3.6 and 5.7 an alloy with a γ' fraction at 900° C. approximately between 19 and 44% is produced resulting in an alloy with an improved combination of high creep strength and resistance to strain-age cracking during additive manufacture and post-processing.

The elements platinum, palladium behave in a similar way to that of tantalum, titanium and niobium i.e. they are γ' forming elements which increase anti-phase boundary energy. These elements can optionally be added to the alloy in substitution for the elements tantalum, titanium and niobium. The benefits of this may include an improvement in resistance to high temperature corrosion. The "aluminium equivalent", for platinum and palladium require correctional factors (determined from their density relative to aluminium) of 0.125 and 0.225 respectively. However, additions of these elements can be limited due to the high cost of these elemental additions. Therefore, those elements can each be present in an amount of up to 1.0 wt. %, preferably they are limited to 0.5 wt. % or less and most preferably 0.1 wt. % or less as this range provides the best balance of cost and improvement to corrosion resistance. It is preferred that the following equations are satisfied to provide the best balance between creep performance and processability by AM:

$$W_{Al}+0.5W_{Ti}+0.3W_{Nb}+0.15W_{Ta}+0.125W_{Pt}+0.225W_{Pd} \ge 3.6$$

and $$W_{Al}+0.5W_{Ti}+0.3W_{Nb}+0.15W_{Ta}+0.125W_{Pt}+0.225W_{Pd} \le 5.7$$

where $W_{Pt}$ and $W_{Pd}$ are the weight percent of platinum and palladium in the alloy respectively.

The relative proportions of aluminium, titanium, niobium and tantalum must also be balanced so as to minimise the risk of hot cracking during solidification in the AM process. Hot cracking is the tearing of a solidifying metal, normally caused by insufficient liquid feeding in the latter stages of solidification and hence allowing cracks to be opened by thermal strain. This can be mitigated by minimising the hot cracking index, as shown in FIGS. 6-9. For the present invention a hot cracking index of 1.6 or less is desired, as it indicates a lower hot cracking risk than the prior art alloys Haynes 282, IN792, IN738, Rene88DT and U720Li. Such a hot cracking index is strongly related to niobium and tantalum levels and can be estimated on the content of those alloys only with the following equation in the range of composition of the present invention:

$$f(HCI)=0.3W_{Nb}+0.15W_{Ta}$$

Where $f(HCI)$ is a numerical value which must be 0.65 or greater in order to lead to a hot cracking index of 1.6 or less at levels of Co and Cr close to the composition of ABD-900 AM. Higher levels of Co and Cr further reduce the hot cracking index. Further improvements in hot cracking resistance can be achieved by ensuring that $f(HCI)$ is 0.68 or greater and even further improvements are available for $f(HCI)$ of 0.75 or greater. More preferably, the hot cracking index is 1.2 or less, as this indicates a reduced risk of hot cracking. It is therefore more preferable that $f(HCI)$ be a numerical value of 1.15 or greater. As evidenced in FIG. 16, the alloy ABD-900AM of the present invention displays less hot cracking than the legacy alloys Haynes 282 and IN738 on account of its lower hot cracking index.

In addition, it is desired that the alloy contain sufficient quantities of Ti, Nb and Ta so as to secure a reasonable strength merit index. On FIGS. 6 to 9 contours are plotted for strength merit indexes of 950 MPa and 1150 MPa. From inspection of FIGS. 6-9 it can be seen that the strength merit index increases with increasing titanium content. Increasing $f(SAC)$ is also associated with an increase in strength merit index. In order to achieve a higher strength merit index than Haynes 282 and ATI 718+ throughout the alloy range a Ti content of at least 1.1 wt % is used. From FIG. 7 it can be seen that in combination with a minimum $f(SAC)$ of 3.6, a maximum of $f(HCI)$ of 1.6 and a minimum of Al of 1.5 wt. % a strength merit index of 950 MPa is not achieved for all levels of Al with 1.0 wt. % titanium. From FIG. 8 it can be seen that for the same conditions except for Ti=2.0 wt. % a strength merit index of 950 MPa is easily achieved and much of the alloy space has a strength merit index of 1150 MPa or greater (that is achieved in the case of $f(SAC)$ being 4.1 or greater, which is preferable).

The addition of elements titanium, niobium and tantalum are added in substitution for the element aluminium, these elements partition to the γ' phase. If the combination of these elements (by atomic percent) is substantially greater than the sum of the aluminium content (by atomic percent) then the stability of the γ' phase may be reduced, resulting in the formation of unwanted phases such as delta (δ) or eta (η). The ratio of the elements (in atomic percent) is approximated by converting the weight percent of the elements titanium, niobium and tantalum by their relative density to aluminium, using the numerical factors 0.5, 0.3 and 0.15 respectively. Thus it is preferred if the ratio of the sum of the element titanium, niobium and tantalum to aluminium is retained to less than 1.5, such that the following equation is satisfied $$\frac{0.5W_{Ti} + 0.3W_{Nb} + 0.15W_{Ta}}{W_{Al}} \leq 1.5$$

Based on these requirements maximum levels of aluminium for the present invention are 4.5 wt. %, corresponding to the highest allowable value of $f(SAC)$ and the lowest value of $f(HCI)$ for the case of 1.1 wt % titanium—this can be understood by substituting the values of $f(HCI)=0.65$ and $W_{Ti}=1.1$ into the equation $f(SAC)=5.7$. More preferably, the maximum aluminium content is 3.9 wt % or 3.7 wt. %, as these levels allow for relatively high levels of titanium, e.g. an alloy of 2.5 wt. % Ti and therefore decreased density. More preferably the maximum aluminium content is 3.1 wt. %, as this may correspond to an alloy of $f(SAC)=5.0$ at this high titanium level.

The lowest permissible aluminium content for the present invention is 1.5 wt. %, based on the requirement for the $\gamma'$ phase stability to be equal or greater than 1.5 and the minimum desired value of $f(SAC)$—this can be understood with reference to FIGS. 6-9 by evaluating the intersection point of the contour lines for gamma prime stability and $f(SAC)=3.6$. An alloy with less than 1.5 wt. % of aluminium in the current design space would have either an unstable $\gamma'$ phase, or an insufficient amount of $\gamma'$ phase to meet the creep life targets. More preferably the minimum aluminium content is 1.7 wt. %, as this ensures a stable $\gamma'$ phase at a value of $f(SAC)$ of 4.1 by ensuring the alloy sits to the right of the $\gamma'$ stability contour in FIGS. 6-9. A low titanium content, corresponding to alloys of good oxidation resistance, requires a high aluminium content for the invention to sit within the desired range of $\gamma'$ content. Conversely, a high titanium content reduces the allowable aluminium content.

The present invention contains sufficient quantities of niobium or tantalum to minimise the risk of hot cracking, as described by the function $f(HCI)$. As will be discussed later (with reference to FIG. 15), tantalum content is limited in conjunction with tungsten so as to keep the alloy density low. In order to reduce the density towards a target density of 8.6 g/cm³, the maximum allowable tantalum content is 5.2 wt. %, based on the minimum tungsten level required for creep resistance (as will be discussed later with reference to FIG. 11). Therefore, niobium is preferred to be 0.6 wt. % or greater in order to secure a hot cracking index of 1.6 or lower at this alloy density. More preferably, niobium content is 1.2 wt. % or greater in order to secure a hot cracking index of 1.2 or lower at this density. A level of niobium of 1.60% or more, or 1.65% or more is beneficial further to decrease the propensity for hot cracking. In order to decrease the hot cracking index a minimum of 0.6 wt. % tantalum is preferred. In order to be below the preferred hot cracking index of 1.2, it is preferred that tantalum content be 1.0 wt. % or greater, particularly with the preferred maximum niobium limit of 3.0 wt. %, as will be discussed later with reference to oxidation resistance.

Figure 10:
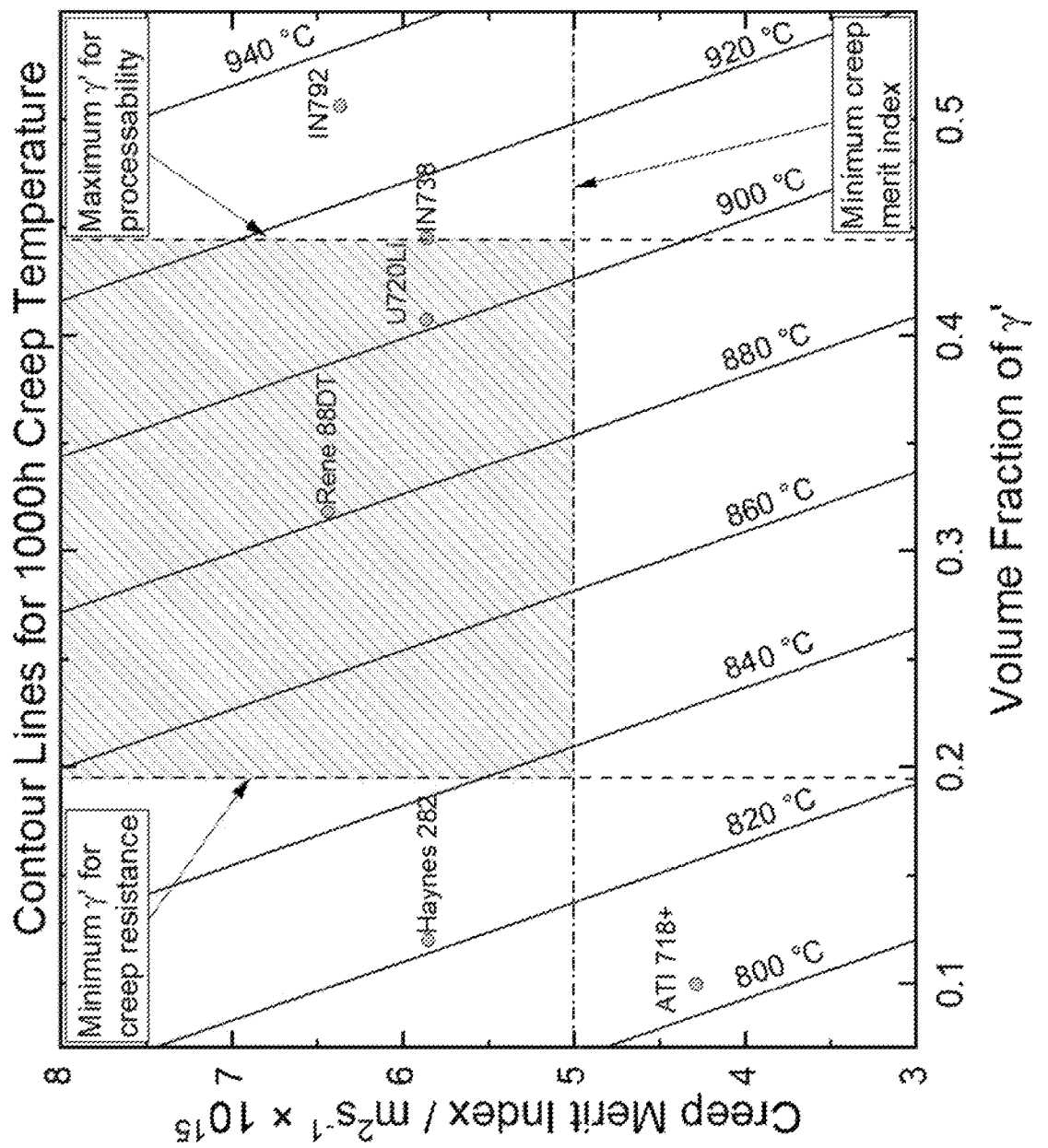
FIG. 10 shows contours of predicted temperature for 1000-hour creep life as functions of γ′-phase fraction and creep merit index. Overlaid are commercial superalloys listed in Table 1, and the limits on γ′ content and creep merit index are marked. The target area of the present invention is shaded.

Another feature of alloys in the present invention is good creep resistance. The relationship between creep merit index, $\gamma'$ volume fraction and predicted creep life is shown in FIG. 10. The minimum aim for the invention is an operating temperature 20° C. or more than Haynes 282. This requires an alloy with a minimum of 19% of $\gamma'$, and a minimum creep merit index of $5.0\times10^{15}$. More preferably the creep temperature capability of the present invention is 40° C. or more than Haynes 282, which requires a $\gamma'$ fraction of 26%. Higher creep merit indices allow for greater creep life by improving resistance to diffusion-controlled creep damage. A creep merit index of $5.5\times10^{15}$ or greater is hence more preferable. A creep merit index of $6.0\times10^{15}$ is more preferable still, as this allows for creep performance competitive with U720Li and IN738.

A higher fraction of $\gamma'$ will also enable a greater creep life by increasing resistance to dislocation-controlled damage. However, excessively high fractions of $\gamma'$ will make the alloy difficult to process by AM (particularly during the post-manufacturing heat treatment) due to the risk of strain-age cracking. It is therefore desired to limit the $\gamma'$ fraction to 44%, which is equivalent to that of IN738. This will allow for comparable or superior creep performance to IN738, depending upon the creep merit index. More preferably the $\gamma'$ fraction is limited to 40%, as this will allow for a creep capability equivalent to or greater than that of U720Li, but with a minimised risk of strain-age cracking. Most preferably the $\gamma'$ content is limited to 35%, as such an alloy would have an equivalent creep life to Rene 88DT with the minimum desired creep merit index of $5.0\times10^{15}$, with a lower still risk of strain-age cracking.

Figure 11:
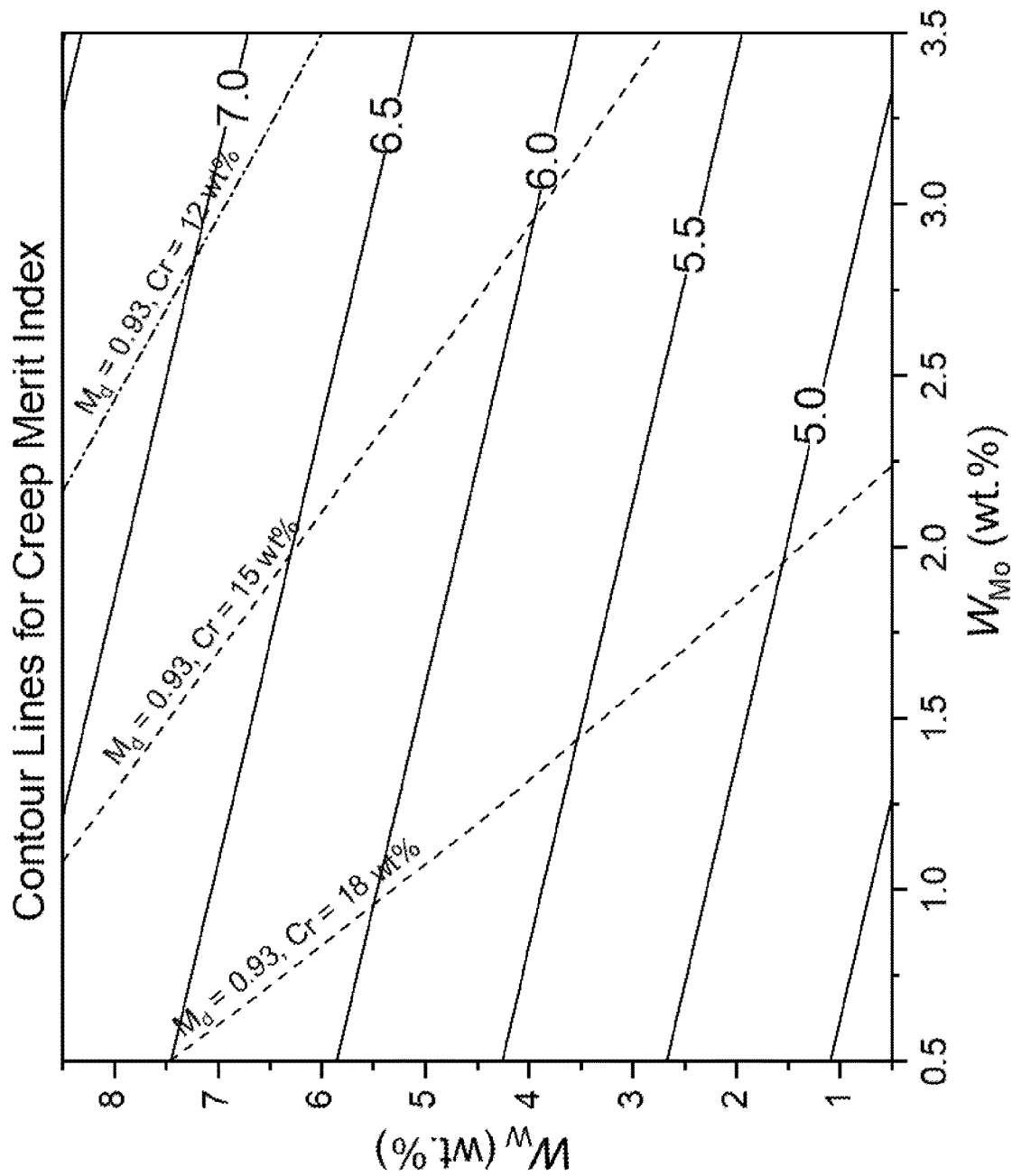
FIG. 11 shows contours of constant creep merit index (labelled values multiplied by $10^{-15}$) as functions of Mo and W content. Overlaid are contour lines of the desired alloy stability number Md=0.93 for fixed Cr levels 12, 15 and 18 wt. %.

The content of molybdenum and tungsten in the present invention is optimised to meet the desired creep merit indices specified earlier. The relationship between the levels of these elements and the creep merit index, as shown in FIG. 11, can be estimated by the following formula:

$$f(\text{creep})=W_W+0.77W_{Mo}$$

Generally speaking, for the creep merit index to be of the desired value of $5.0\times10^{15}$ or greater, the function $f(\text{creep})$ must have a numerical value of 3.0 or greater. For the more preferable creep merit index of $5.5\times10^{15}$, $f(\text{creep})$ must have a numerical value of 4.6 or greater, and for a most preferable value of $6.0\times10^{15}$ the value of $f(\text{creep})$ must have a numerical value of 6.2 or greater. Overlaid on this graph are contours of constant alloy stability against TCP phase formation for different levels of chromium—compositions lying to the left of each line have a lower Md stability number for the given level of chromium. This demonstrates that greater creep merit indices can be achieved at lower levels of chromium, and that a trade-off must be managed between creep resistance, oxidation resistance and stability.

Figure 12:
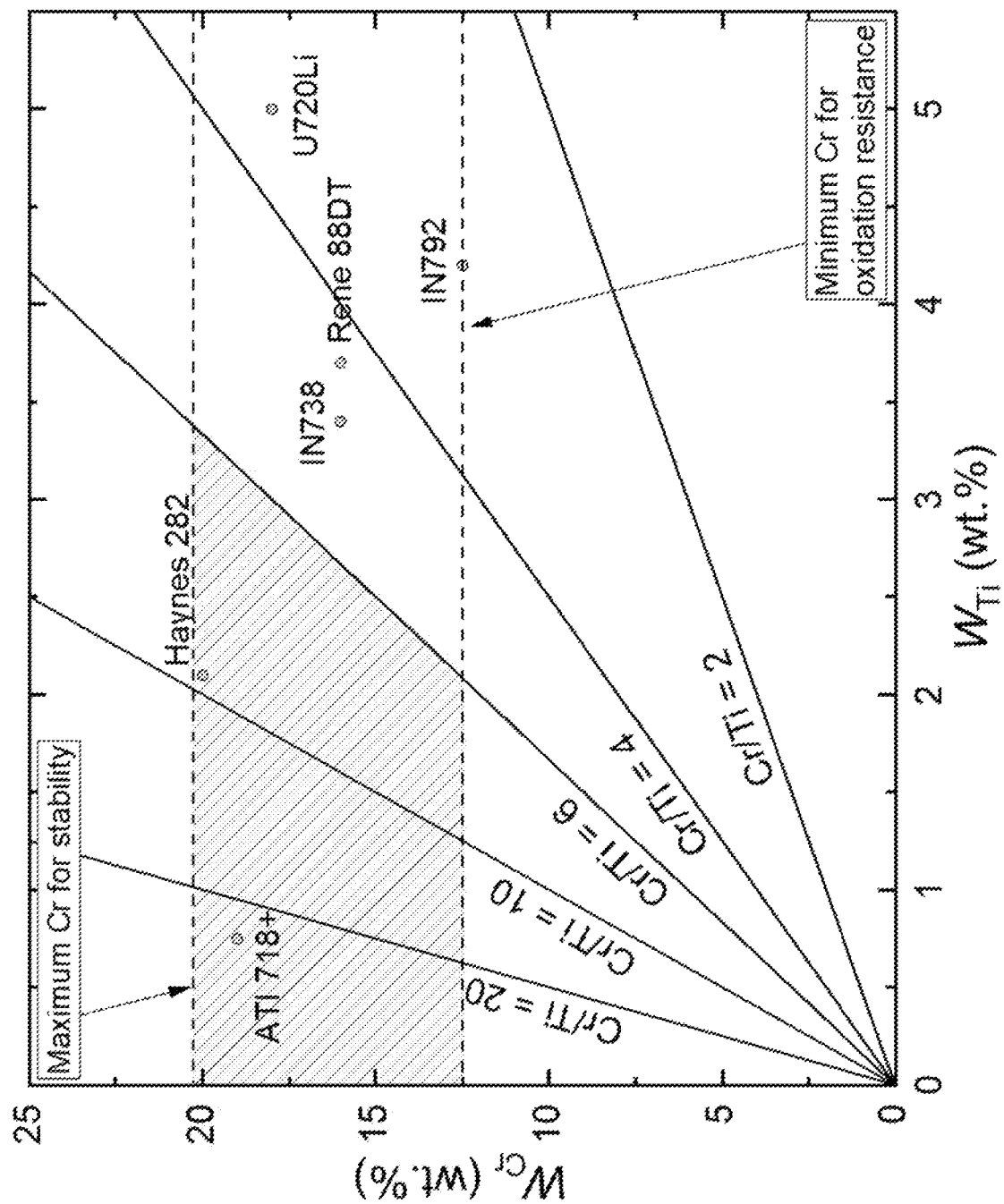
FIG. 12 shows contours of Cr/Ti ratio as functions of Cr and Ti content, with the commercial alloys of Table 1 plotted. The target area of the present invention is shaded.

The maximum content of molybdenum in the present invention is 3.0 wt. %, in order to ensure adequate resistance to hot corrosion and low levels of TCP phase, as such phases are strongly detrimental to the creep properties of the alloy—the balance of Mo in relation to Cr and W in terms of maintaining alloy stability will be discussed later with respect to FIGS. 11 and 12. FIG. 17 shows microstructures after heat treatment of 1000 hours at 760° C. of: Left—example alloy which falls outside the scope of the present invention only due to too much molybdenum of 3.3 wt. %; Right— ABD-900AM from the present application. This demonstrates the importance of limiting molybdenum to 3.0 wt. % or less in this alloy. More preferably the maximum molybdenum content is 2.9 wt. % or even 2.5 wt. % to improve the resistance to hot corrosion. On this basis, the level of tungsten in the present invention is 0.9 wt. % or greater in order to provide adequate resistance to creep damage (in terms of a creep merit index of $5.0\times10^{15}$). More preferably, the tungsten content is 1.2 wt. % or greater, particularly in the case that molybdenum content is 2.5 wt. % or less. Greater values of the creep merit index require greater values of tungsten; to secure a creep merit index of 5.5×10$^{15}$ a minimum tungsten content of 2.3 wt. % preferred, more preferably 2.7 wt. %, particularly for the cases of Mo content being 3.0 wt. % and 2.5 wt. % respectively.

The elements rhenium, ruthenium and iridium behave in a similar way to that of tungsten i.e. they are gamma forming elements which improve the creep merit index. These elements can optionally be added to the alloy. Additions of these elements will significantly increase the creep response of the alloy in comparison to tungsten (as they have much slower diffusivity), however this is achieved with substantial increases in cost due to the high cost of the elements. Preferably the addition of rhenium is limited to 3.0 wt. % or 2.0 wt. % and iridium is limited to less than 3.0 wt. % and even more preferably less than 2.0 wt. %, most preferably less than 1.5 wt. % due to their elemental cost. Ruthenium deleteriously increases hot cracking index and so it is limited 2.0 wt. %, preferably 1.5 wt. %.

The alloy of the present invention is required to have excellent oxidation and corrosion resistance at temperatures exceeding 900° C. In this regime a passivating chromia oxide scale ($Cr_2O_3$) is a suitable means of providing the alloy against further oxidation damage. In order to produce a continuous chromia scale, a substantial chromium content in the alloy is required. Based on the known properties of prior art alloys, a minimum chromium content of 12.5 wt. % is desired, as this will allow for an equivalent oxidation resistance to that of IN792. Any increases in chromium content beyond this level are desirable, because they will increase the supply of chromium atoms for scale formation and hence minimise the duration of the vulnerable transient period during which oxide is forming. More preferably the minimum chromium content of the present invention should be 16.0 wt. %, because this will allow for a comparable or superior oxidation resistance to that of IN738.

In addition to forming a continuous chromia scale, the present invention also encompasses alloys with a fast forming dense chromia scale i.e. one that forms early on during environmental exposure. The presence of titanium is known to be deleterious to the stability of a chromia scale— titanium in particular is detrimental by increasing the diffusivity of oxygen through the scale, damaging the underlying material in the process (see Chromia layer growth on a Ni-based superalloy: Sub-parabolic kinetics and the role of titanium, Cruchley et al. Corrosion Science 2013). On this basis, the ratio of chromium to titanium content (in wt. %) is used to gauge chromia scale stability. Based on the prior art alloys in table 3, it is desired to have a Cr/Ti ratio greater than 6.0, as this allows a greater oxidation resistance than IN738, U720Li, Rene 88DT, as is shown graphically in FIG. 12. More preferably a Cr/Ti ratio of 6.9, or more preferably 7.5 or greater is desired, as this allows for a more stable and continuous protective oxide scale.

Based upon the maximum chromium content of the alloy of 20.6 wt. % (as will be discussed later with reference to FIG. 13), it can be seen that the titanium content of the present invention is desired to be 3.4 wt. % or less based upon a Cr/Ti ratio of 6.0. Based on the more preferable Cr/Ti ratio of 6.9 a maximum titanium content of 3.0 wt. % is preferred. More preferably the Cr/Ti ratio is 7.5, corresponding to a preferred maximum titanium content of 2.7 wt. %, as it will permit greater resistance to oxidation damage.

Alloying additions of niobium are also known to negatively influence oxidation. This is because niobium forms grain boundary carbides which are particularly detrimental for oxidation assisted cracking mechanisms in which damage may accumulate along grain boundaries, such as under low cycle fatigue, creep-fatigue conditions or during high temperature creep. However, additions of niobium are beneficial for improving resistance to hot cracking resistance (as discussed previously with reference to FIGS. 6-9) and strength, so its use is limited to 4.0 wt. %, more preferably 3.0 wt. % or less.

Figure 13:
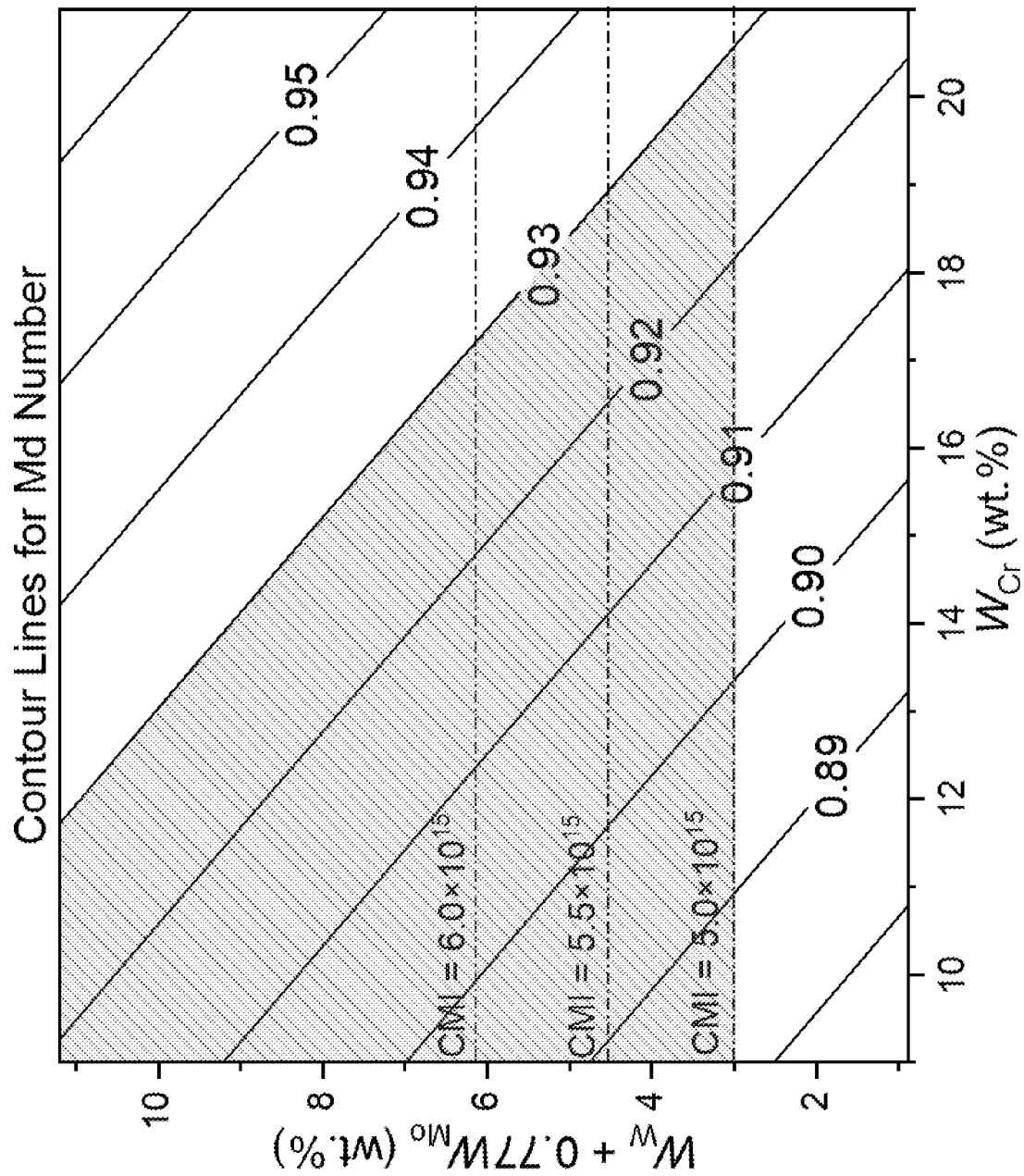
FIG. 13 is a contour plot showing the gamma matrix stability in terms of Md number for the present invention, as functions of Cr content and W+0.77Mo (wt. %). Overlaid are horizontal lines corresponding to the desired creep resistance.

The elements molybdenum, tungsten and chromium all contribute to the propensity of an alloy to form deleterious TCP phases. The relationship between these elements and the stability index Md, which describes the susceptibility of a composition to TCP formation, is shown in FIG. 13. For the present invention a stability index of 0.93 or less is desired, based on the values for prior art alloys in table 3. This constraint can be modelled in the preferred alloy range as:

$$f(Md) = W_W + 0.77 W_{Mo} + 0.93 W_{Cr}$$

Where a $f(Md)$ numerical value of 22.1 or less indicates a stability merit index of 0.93. Based on the aforementioned requirement for a value of $f(creep)$ of 5.0×10$^{15}$ or greater, it can be seen that the maximum permissible chromium content is 20.6 wt. %. Reducing chromium to a maximum of 19.5% increases stability. More preferably it is required that the creep merit index is 5.5×10$^{15}$, requiring that the function $f(creep)$ is 4.6 or greater. This imposes a more preferable maximum value of Cr of 19.0 wt. %. Most preferably the creep merit index is 6.0×10$^{15}$ or greater, therefore the maximum value of Cr is most preferably 17.3 wt. %. A preferred level for $f(Md)$ is 21.5 or less for superior alloy stability.

Figure 14:
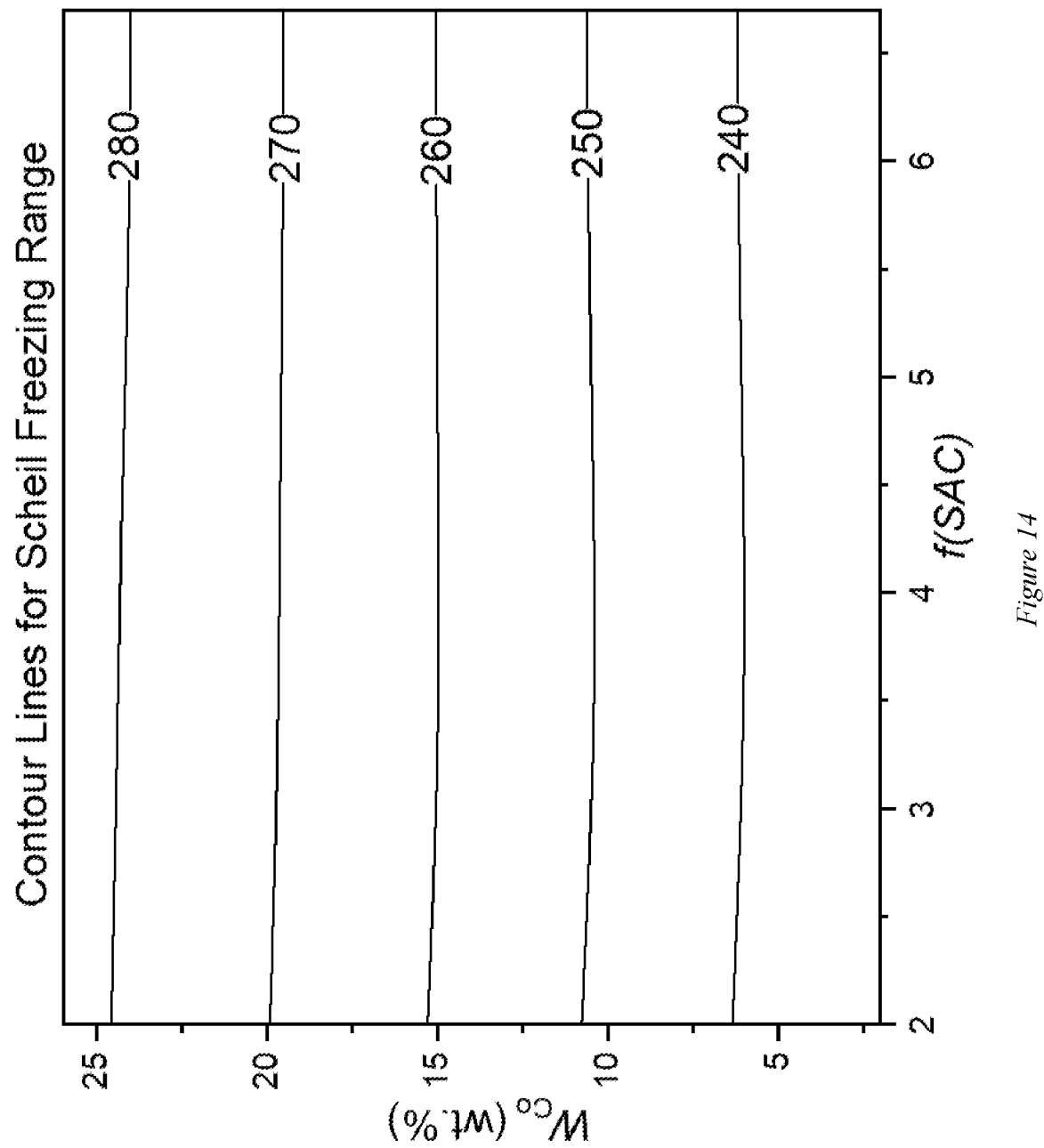
FIG. 14 is a contour plot of the predicted non-equilibrium freezing range of alloys in the design space as functions of Co content and the strain-age cracking index.

The risk of hot cracking in the present invention may also be mitigated by restricting the freezing range of the alloy, as this reduces the vulnerable time window during which hot cracking may occur. In the present invention a freezing range (as predicted by the Scheil-Gulliver approach) is desired to be 280° C. or less, which according to FIG. 14 requires that cobalt content be 24 wt. % or less. More preferably the Scheil freezing range is 270° C. or less, which requires cobalt content to be 20 wt. % or less.

However, cobalt is beneficial for certain material properties in nickel-based superalloys, such as intermediate-temperature creep resistance (by increasing the stacking fault energy in the matrix phase) and thermal conductivity. It is therefore desired to have a minimum of 5.0 wt. % of cobalt. More preferably the minimum cobalt content is 10.0 wt. %, as this provides a stacking fault energy greater than that of IN738.

Figure 15:
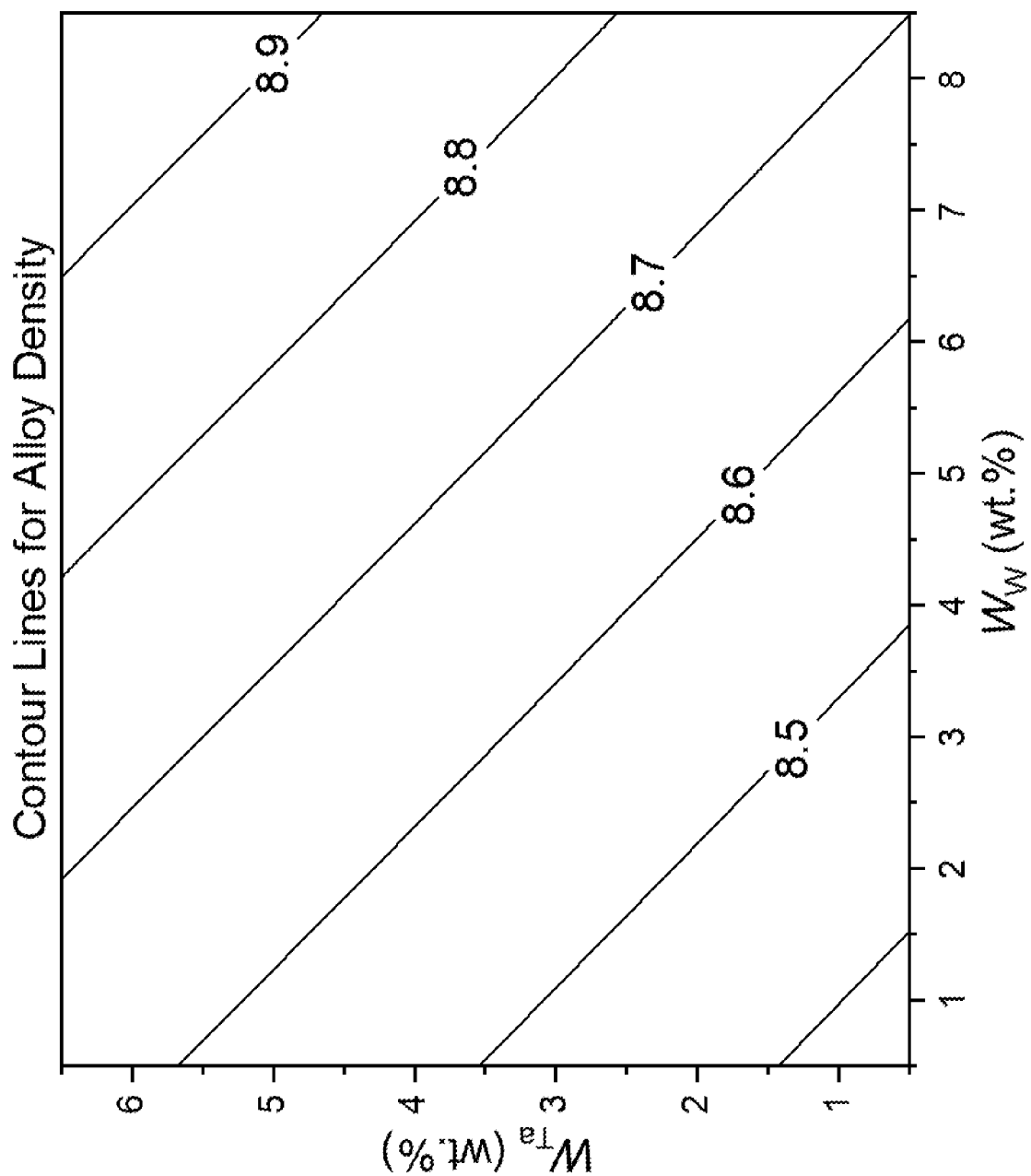
FIG. 15 is a contour plot of calculated alloy density in the current design space as functions of Ta and W content in wt. %.

In addition to maximising the mechanical properties of the alloy, it is desired to minimise the density. This is done by controlling the content of additions of high atomic mass, particularly tungsten and tantalum. The relationship between the levels of these two elements and predicted alloy density is shown in FIG. 15 for average levels of other elements, and leads to a model in the elemental range of the present invention and meeting $f(HCI)$ and $f(SAC)$ that can be described as follows:

$$f(density) = W_{Ta} + 0.92 W_W$$

Where $f(density)$ is a numerical value. A maximum target alloy density is 8.6 g/cm$^3$ or less is generally achieved when the value of $f(density)$ is 6.1 or less. Lower levels of titanium, for example, have an adverse effect on density and for such alloys $f(density)$ may under predict the density because greater additions of Nb and Ta are required to meet the requirement for $f(SAC)$. Higher levels of other elements, e.g. molybdenum can lead to an actual density greater than predicted by $f(density)$. If $f(density)$ is 5.4 or less, a less dense alloy is achieved which is desirable. More preferably the alloy density is 8.55 g/cm³ or less, as this results in lighter parts which require less creep strength when used in rotating applications. In this case, the value of ƒ(density) is 5.1 or less. If ƒ(density) is 4.8 or less or even 4.0 or less, alloys of even lower density are achievable.

These restrictions place upper limits on the content of tantalum and tungsten: tantalum is 5.2 wt. % or less, most preferably 4.2 wt. % or less (considering the minimum tungsten requirement for creep of 0.9 wt. % described previously). Tungsten maximum is 6.6 wt. % or less based on ƒ(density), preferably 5.5 wt. % or less. Based on the most preferable minimum limit of tantalum of 1 wt. %, the maximum tungsten content is most preferably 4.5 wt. % or less in order to achieve the most preferable density.

Additions of carbon, boron and zirconium are required in order to provide strength to grain boundaries. This is particularly beneficial for the creep and fatigue properties of the alloy. However, these elements can all cracking during the AM process due to solidification and/or liquation cracking mechanisms. The carbon concentrations should therefore range from 0.02 wt. % to 0.15 wt. %. Preferably lower levels of carbon are preferred in order to reduce cracking during the additive manufacturing process, thus a content of less than 0.08 wt. % is preferred. The boron concentration should range from 0.001 to 0.015 wt. %, preferably less than 0.008 wt. % as boron strongly separates to the liquid phase during solidification. Likewise, zirconium concentrations should range up to 0.1 wt. %, more preferably from 0.0 wt. % to 0.02 wt. %.

It is beneficial that when the alloy is produced, it is substantially free from incidental impurities. These impurities may include the elements sulphur (S), manganese (Mn) and copper (Cu). The element sulphur should remain 0.003 wt. % or less (30 PPM in terms of mass). The presence of sulphur above 0.003 wt. %, can lead to embrittlement of the alloy and sulphur also segregates to alloy/oxide interfaces formed during oxidation, preferably sulphur levels are 0.001 wt. % or less. Manganese is an incidental impurity which is limited to 0.25 wt. %, preferably this limited to 0.1 wt. % or less. Copper is an incidental impurity which is preferably limited to 0.5 wt. %. Vanadium (V) is an incidental impurity, which negatively influences the oxidation behaviour of the alloy and is which is preferably limited to 0.5 wt. %, preferably 0.3 wt. % or less and most preferably this limited to 0.1 wt. % or less. This segregation may lead to increased spallation of protective oxide scales. If the concentrations of these incidental impurities exceed the specified levels, issues surrounding product yield and deterioration of the material properties of the alloy is expected.

Iron behaves in a similar way to nickel and can be added as a low-cost alternative to nickel. Moreover, tolerance to iron additions improves the ability of the alloy to be manufactured from recycled materials. Therefore, it is preferred that iron is present in an amount of at least 0.1 wt. %. However, additions of iron up to 5.0 wt. % can be made in order to substantially reduce the cost. Preferably the additions of iron are 3.8 wt. % or even 2.0 wt. % or less in order to reduce the propensity to form the unwanted Laves phase (which degrades the mechanical properties of the alloy), and to minimise the strongly detrimental impact that iron has upon oxidation resistance. Most preferably iron additions are limited to 1.0 wt. % as this produces an alloy which has good ability to be recycled with only marginal loss in material performance.

Additions of hafnium (Hf) of up to 1.0 wt. % are beneficial for tying up incidental impurities in the alloy and for providing strength. Hafnium is a strong carbide former it can provide additional grain boundary strengthening. However, it has a high elemental cost and may exacerbate solidification cracking by segregating strongly to the terminal liquid during additive manufacturing. Additions are therefore more preferably limited to 0.5 wt. %, or more preferably 0.25 wt. %.

Additions of the so called 'reactive-elements', yttrium (Y), lanthanum (La) and cerium (Ce) may be beneficial up to levels of 0.1 wt. % to improve the adhesion of protective oxide layers, such as $Al_2O_3$. These reactive elements can 'mop up' tramp elements, for example sulphur, which segregates to the alloy oxide interface weakening the bond between oxide and substrate leading to oxide spallation. Magnesium (Mg) likewise may act to 'mop up' tramp elements, and can have beneficial effects on mechanical properties, so may be added up to 0.1%. Additions of silicon (Si) up to 0.5 wt. % may be beneficial, it has been shown that additions of silicon to nickel based superalloys at levels up to 0.5 wt. % are beneficial for oxidation properties. In particular silicon segregates to the alloy/oxide interface and improves cohesion of the oxide to the substrate. This reduces spallation of the oxide, hence improving oxidation resistance.

EXAMPLES OF INVENTION

TABLE 5

Nominal compositions in wt % of the newly designed high volume fraction of γ' nickel-based superalloys compared with the alloys listed in Table 1.

| Alloy | Al | Co | Cr | Mo | Nb | Ta | Ti | W | C | B | Zr | Fe | f(SAC) | f(HCI) | f(density) |
|---|---|---|---|---|---|---|---|---|---|---|---|---|---|---|---|
| Haynes 282 | 1.5 | 10 | 20 | 8.5 | 0 | 0 | 2.1 | 0 | 0.06 | 0.005 | 0 | 0 | 2.6 | 0 | 0.0 |
| ATI 718+ | 1.5 | 9 | 19 | 2.8 | 5.5 | 0 | 0.8 | 1.1 | 0.08 | 0.005 | 0 | 9 | 3.5 | 1.65 | 1.0 |
| Rene 88 DT | 2.1 | 13 | 16 | 4 | 0.7 | 0 | 3.7 | 4 | 0.04 | 0.015 | 0.05 | 0 | 4.2 | 0.21 | 3.7 |
| U720Li | 2.5 | 14.8 | 18 | 3 | 0 | 0 | 5 | 1.3 | 0.02 | 0.015 | 0.04 | 0 | 5.0 | 0 | 1.2 |
| IN738LC | 3.4 | 8.5 | 16 | 1.7 | 0.8 | 1.7 | 3.4 | 2.5 | 0.11 | 0.01 | 0.05 | 0 | 5.7 | 0.51 | 4.1 |
| IN792 | 3.2 | 9 | 12.5 | 1.8 | 0 | 3.9 | 4.2 | 3.9 | 0.21 | 0.02 | 0.1 | 0 | 5.9 | 0.59 | 7.5 |
| ABD-900AM | 2.1 | 20 | 17 | 2.1 | 1.8 | 1.6 | 2.3 | 3.1 | 0.04 | 0.005 | — | — | 4.0 | 0.77 | 4.4 |

TABLE 6

Calculated phase fractions and merit indices made with the "Alloys-by-Design" software. Results for conventional nickel-based superalloys used listed in Table 1.

| Alloy | γ' | Creep Merit Index (m$^{-2}$s × 10$^{-15}$) | Density g/cm$^3$ | Strength Merit Index MPa | Cr/Ti Ratio | Md eV | Hot Cracking Index | Freezing Range °C. | Cost $/kg |
|---|---|---|---|---|---|---|---|---|---|
| Haynes 282 | 0.12 | 5.9 | 8.6 | 809 | 9.5 | 0.92 | 2.07 | 189 | 4.8 |
| ATI 718+ | 0.10 | 4.3 | 8.6 | 836 | 25.3 | 0.92 | 0.28 | 128 | 5.6 |
| Rene88DT | 0.32 | 6.4 | 8.5 | 1368 | 4.3 | 0.92 | 2.0 | 231 | 5.1 |
| U720Li | 0.41 | 5.9 | 8.2 | 1524 | 3.6 | 0.92 | 1.83 | 207 | 4.8 |
| IN738LC | 0.45 | 5.9 | 8.3 | 1498 | 4.7 | 0.92 | 1.95 | 217 | 5.4 |
| IN792 | 0.51 | 6.4 | 8.5 | 1701 | 3.0 | 0.92 | 2.05 | 226 | 7.5 |
| ABD-900AM | 0.28 | 5.8 | 8.6 | 1362 | 7.4 | 0.91 | 1.03 | 203 | 7.7 |

The novel example alloy ABD-900AM in tables 5 and 6 has been designed to overcome the shortcomings of the prior art alloys in the context of additive manufacturing. The γ' content has been controlled by varying the quantity ƒ(SAC), resulting in a lower value than many of the benchmark alloys, and hence a lower risk of strain-age cracking. The strength merit index has been designed to be competitive with the legacy alloys in spite of the lower γ' content due to the greater proportion of Nb and Ta, which act to increase the APB strengthening factor. These same additions also lead to a distinct reduction of the hot cracking index, reducing the risk of cracking during solidification. Creep merit index is preferably maximised within the bounds of alloy stability by the presence of Mo and W, and favourable oxidation resistance is preferably achieved by a high Cr/Ti ratio.

Figure 16:
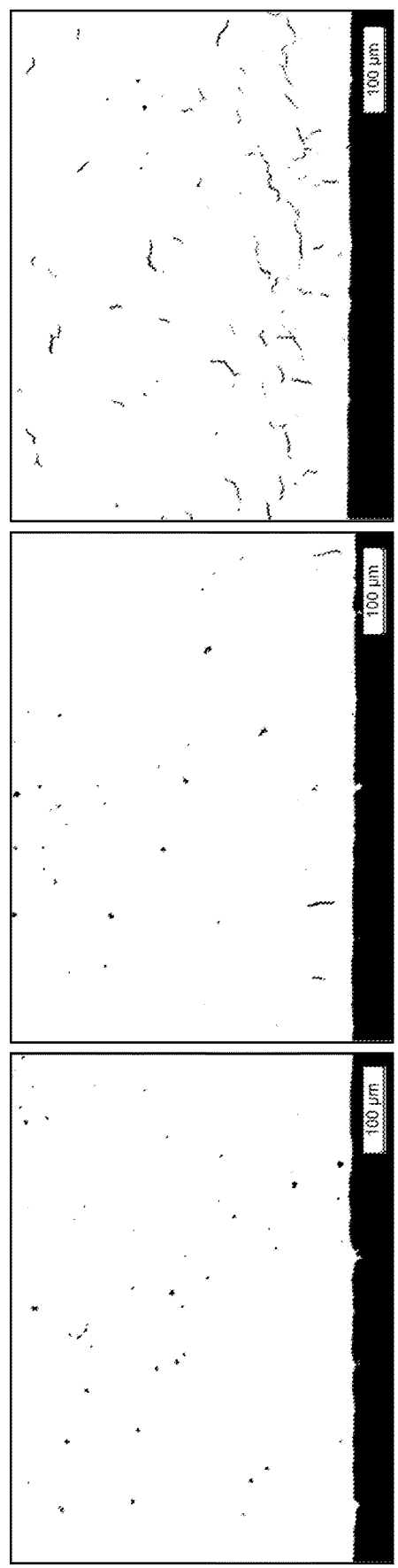
FIG. 16 shows micrographs of the novel nickel-based superalloy ABD-900AM of the present invention, and the prior art superalloys Haynes 282 and IN738, demonstrating the lower micro-crack density of the present invention.

FIG. 16 shows the reduction in micro-crack density of ABD-900 AM compared to Haynes 282 and IN 738. Tests have shown comparable strength and creep resistance of ABD-900 AM to additive manufactured IN 738.

TABLE 7

Nominal compositions in wt % of the newly designed high volume fraction of γ' nickel-based superalloys. C and B levels are fixed at 0.04 wt. % and 0.005 wt % respectively.

| Alloy | Al | Co | Cr | Mo | Nb | Ta | Ti | W | Fe | f(SAC) | f(HCI) | f(density) |
|---|---|---|---|---|---|---|---|---|---|---|---|---|
| AM901 | 2.1 | 18 | 17 | 2.1 | 1.8 | 1.5 | 2.30 | 3.1 | 2 | 4.02 | 0.77 | 4.35 |
| AM902 | 2.1 | 16 | 17 | 2.1 | 1.8 | 1.5 | 2.30 | 3.1 | 4 | 4.02 | 0.77 | 4.35 |
| AM903 | 2.1 | 17 | 17 | 2.1 | 1.8 | 1.5 | 2.30 | 3.1 | 0 | 4.02 | 0.77 | 4.35 |
| AM904 | 2.1 | 14 | 17 | 2.1 | 1.8 | 1.5 | 2.30 | 3.1 | 0 | 4.02 | 0.77 | 4.35 |
| AM905 | 2.1 | 11 | 17 | 2.1 | 1.8 | 1.5 | 2.30 | 3.1 | 0 | 4.02 | 0.77 | 4.35 |
| AM906 | 2.1 | 8 | 17 | 2.1 | 1.8 | 1.5 | 2.30 | 3.1 | 0 | 4.02 | 0.77 | 4.35 |
| AM907 | 2.1 | 5 | 17 | 2.1 | 1.8 | 1.5 | 2.30 | 3.1 | 0 | 4.02 | 0.77 | 4.35 |
| AM908 | 2.1 | 2 | 17 | 2.1 | 1.8 | 1.5 | 2.30 | 3.1 | 0 | 4.02 | 0.77 | 4.35 |

TABLE 8

Calculated phase fractions and merit indices made with the "Alloys-by-Design" software of the alloys listed in table 7.

| Alloy | γ' | Creep Merit Index (m$^{-2}$s × 10$^{-15}$) | Density g/cm$^3$ | Strength Merit Index MPa | Cr/Ti ratio | Md eV | Hot Cracking Index | Scheil Freezing Range °C. | Cost $/kg |
|---|---|---|---|---|---|---|---|---|---|
| AM901 | 0.28 | 5.39 | 8.59 | 1362 | 7.4 | 0.91 | 0.92 | 266 | 7.35 |
| AM902 | 0.28 | 5.39 | 8.57 | 1361 | 7.4 | 0.91 | 0.82 | 263 | 7.02 |
| AM903 | 0.28 | 5.39 | 8.61 | 1349 | 7.4 | 0.91 | 1.12 | 267 | 7.18 |
| AM904 | 0.28 | 5.39 | 8.61 | 1329 | 7.4 | 0.91 | 1.21 | 264 | 6.68 |
| AM905 | 0.27 | 5.39 | 8.61 | 1302 | 7.4 | 0.91 | 1.35 | 265 | 6.19 |
| AM906 | 0.26 | 5.39 | 8.61 | 1267 | 7.4 | 0.91 | 1.43 | 259 | 5.69 |
| AM907 | 0.25 | 5.39 | 8.61 | 1223 | 7.4 | 0.91 | 1.54 | 256 | 5.20 |
| AM908 | 0.23 | 5.39 | 8.61 | 1171 | 7.4 | 0.91 | 1.64 | 253 | 4.70 |

Tables 7 and 8 show variations on ABD-900AM, in which the Fe and Co contents are altered. AM901 and AM902 contain small amounts of Fe (substituted in for Co), increasing tolerance to recycled material and marginally reducing the elemental cost, while sacrificing some oxidation resistance. AM903 to AM908 have incremental reductions in Co content (substituted out for Ni). This has the beneficial effect of reducing the cost of the alloy due to the relatively high price of Co. However, lower cobalt levels also correspond to slight increases in the hot cracking index and slight decreases to the γ' content. AM 906-AM 908 have the lowest strength merit index of all examples. AM 906-AM-908 have low levels of cobalt, an element which improves strength, as well as intermediate-temperature creep resistance and thermal conductivity.

TABLE 9

Nominal compositions in wt % of the newly designed high volume fraction of γ' nickel-based superalloys. C and B levels are fixed at 0.04 wt. % and 0.005 wt % respectively.

| Alloy | Al | Co | Cr | Mo | Nb | Ta | Ti | W | Zr | Hf | f(SAC) | f(HCI) | f(density) |
|---|---|---|---|---|---|---|---|---|---|---|---|---|---|
| AM909 | 2.1 | 17 | 20 | 2.1 | 1.8 | 1.5 | 2.3 | 3.1 | 0.01 | 0 | 4.015 | 0.77 | 4.35 |
| AM910 | 2.1 | 17 | 20 | 2.1 | 1.8 | 1.5 | 2.3 | 3.1 | 0.05 | 0 | 4.015 | 0.77 | 4.35 |
| AM911 | 2.1 | 17 | 20 | 2.1 | 1.8 | 1.5 | 2.3 | 3.1 | 0.01 | 0.2 | 4.015 | 0.77 | 4.35 |
| AM912 | 2.1 | 17 | 20 | 2.1 | 1.8 | 1.5 | 2.3 | 3.1 | 0.05 | 0.2 | 4.015 | 0.77 | 4.35 |

TABLE 10

Calculated phase fractions and merit indices made with the "Alloys-by-Design" software of the alloys listed in table 9.

| Alloy | γ' | Creep Merit Index ($m^{-2}s \times 10^{-15}$) | Density $g/cm^3$ | Strength Merit Index MPa | Cr/Ti Ratio | Md eV | Hot Cracking Index | Scheil Freezing Range °C. | Cost $/kg |
|---|---|---|---|---|---|---|---|---|---|
| AM909 | 0.28 | 5.39 | 8.61 | 1363 | 7.4 | 0.91 | 1.07 | 276 | 7.68 |
| AM910 | 0.28 | 5.39 | 8.61 | 1364 | 7.4 | 0.91 | 1.20 | 300 | 7.68 |
| AM911 | 0.29 | 5.42 | 8.62 | 1368 | 7.4 | 0.91 | 1.35 | 331 | 8.22 |
| AM912 | 0.28 | 5.46 | 8.62 | 1335 | 7.4 | 0.91 | 1.46 | 355 | 8.23 |

Tables 9 and 10 show variants of ABD-900AM that are optimised for increased grain boundary strength, through additions of Zr and Hf. AM911 and AM912 may also have superior oxidation resistance, due to the beneficial impacts of Hf upon oxide scale adhesion. However, all of these alloys have higher hot cracking indices and wider Scheil freezing range than the base ABD-900AM composition, due to the action of Zr and Hf as melting point depressants. There is hence a trade-off to be managed between printability and the grain boundary strength of an alloy within the space of this invention.

TABLE 11

Nominal compositions in wt % of the newly designed high volume fraction of γ' nickel-based superalloys. C and B levels are fixed at 0.04 wt. % and 0.005 wt % respectively.

| Alloy | Al | Co | Cr | Mo | Nb | Ta | Ti | W | Re | Ru | f(SAC) | f(HCI) | f(density) |
|---|---|---|---|---|---|---|---|---|---|---|---|---|---|
| AM913 | 2.1 | 20 | 17 | 1.9 | 1.8 | 1.5 | 2.3 | 2.6 | 1 | 0 | 4.02 | 0.77 | 3.89 |
| AM914 | 2.1 | 20 | 17 | 1.6 | 1.8 | 1.5 | 2.3 | 2.1 | 2 | 0 | 4.02 | 0.77 | 3.43 |
| AM915 | 2.1 | 20 | 17 | 1.4 | 1.8 | 1.5 | 2.3 | 1.6 | 3 | 0 | 4.02 | 0.77 | 2.97 |
| AM916 | 2.1 | 20 | 17 | 1.6 | 1.8 | 1.5 | 2.3 | 2.1 | 0 | 1 | 4.02 | 0.77 | 3.43 |
| AM917 | 2.1 | 20 | 17 | 1.1 | 1.8 | 1.5 | 2.3 | 1.1 | 0 | 2 | 4.02 | 0.77 | 2.51 |

TABLE 12

Calculated phase fractions and merit indices made with the "Alloys-by-Design" software of the alloys listed in table 11.

| Alloy | γ' | Creep Merit Index (m$^{-2}$s × 10$^{-12}$) | Density g/cm$^3$ | Strength Merit Index MPa | Cr/Ti Ratio | Md eV | Hot Cracking Index | Scheil Freezing Range ° C. | Cost $/kg |
|---|---|---|---|---|---|---|---|---|---|
| AM913 | 0.29 | 6.40 | 8.63 | 1371 | 7.4 | 0.91 | 1.01 | 268 | 22.05 |
| AM914 | 0.29 | 7.42 | 8.66 | 1378 | 7.4 | 0.91 | 0.99 | 267 | 36.42 |
| AM915 | 0.29 | 8.45 | 8.68 | 1385 | 7.4 | 0.91 | 1.01 | 272 | 50.79 |
| AM916 | 0.28 | 6.01 | 8.59 | 1344 | 7.4 | 0.90 | 1.30 | 313 | 71.05 |
| AM917 | 0.27 | 6.62 | 8.59 | 1323 | 7.4 | 0.89 | 1.67 | 313 | 132.77 |

Tables 11 and 12 describe alloys AM913 to AM917, which are variants of ABD-900 with the additions of Re and Ru for additional creep resistance. Of the two elements, Re is seen to have the greater impact in terms of creep merit index, whilst also having less detrimental to impact upon cost and the hot cracking index. However, additions of Re lead to a greater increase in density due to the high atomic mass of Re.

TABLE 13

Nominal compositions in wt % of the newly designed high volume fraction of γ' nickel-based superalloys. C and B levels are fixed at 0.04 wt. % and 0.005 wt % respectively.

| Alloy | Al | Co | Cr | Mo | Nb | Ta | Ti | W | f(SAC) | f(HCI) | f(density) |
|---|---|---|---|---|---|---|---|---|---|---|---|
| AM918 | 2.1 | 20 | 17 | 2.1 | 2.05 | 2 | 2.00 | 3.1 | 4.02 | 0.92 | 4.85 |
| AM919 | 2.1 | 20 | 17 | 2.1 | 2.3 | 2.5 | 1.70 | 3.1 | 4.02 | 1.07 | 5.35 |
| AM920 | 2.2 | 20 | 17 | 2.1 | 2.1 | 2.1 | 2.50 | 3.1 | 4.4 | 0.95 | 4.95 |
| AM921 | 2.3 | 20 | 17 | 2.1 | 2.4 | 2.7 | 2.70 | 3.1 | 4.78 | 1.13 | 5.55 |

TABLE 14

Calculated phase fractions and merit indices made with the "Alloys-by-Design" software of the alloys listed in table 13.

| Alloy | γ' | Creep Merit Index (m$^{-2}$s × 10$^{-15}$) | Density g/cm$^3$ | Strength Merit Index MPa | Cr/Ti Ratio | Md eV | Hot Cracking Index | Scheil Freezing Range ° C. | Cost $/kg |
|---|---|---|---|---|---|---|---|---|---|
| AM918 | 0.28 | 5.40 | 8.65 | 1378 | 8.5 | 0.91 | 0.84 | 266 | 8.25 |
| AM919 | 0.28 | 5.41 | 8.70 | 1392 | 10.0 | 0.91 | 0.68 | 262 | 8.83 |
| AM920 | 0.33 | 5.68 | 8.60 | 1516 | 6.8 | 0.92 | 0.70 | 262 | 8.40 |
| AM921 | 0.34 | 6.01 | 8.59 | 1555 | 6.3 | 0.92 | 0.49 | 255 | 9.12 |

Tables 13 and 14 describe a series of variations on ABD-900AM in which the amounts and proportions of the γ' phase forming elements are manipulated. Alloys AM918 and AM919 contain increasing levels of niobium and tantalum, being substituted in for titanium on a density corrected basis so as to maintain a constant value of the strain-age cracking merit index. The result is incremental reductions to the hot cracking index, and improvements to the strength merit index and oxidation resistance (as indicated by the Cr/Ti ratio). In AM921 and AM922, the amounts of Al, Nb, Ti and Ta have all been increased in proportion (on a density corrected basis). The result is alloys of higher γ' content and strength merit index, but also of higher strain-age cracking merit index. These alloys are also predicted to have less favourable oxidation resistance due to their lower Cr/Ti ratios.

TABLE 15

Nominal compositions in wt. % of the newly designed high volume fraction of γ' nickel-based superalloys.
C and B levels are fixed at 0.04 wt. % and 0.005 wt % respectively.

| Alloy | Al | Co | Cr | Mo | Nb | Ta | Ti | W | f(SAC) | f(HCI) | f(density) |
|---|---|---|---|---|---|---|---|---|---|---|---|
| AM922 | 2.5 | 20 | 15.5 | 2.3 | 2.1 | 1.7 | 2.09 | 3.7 | 4.38 | 0.89 | 5.10 |
| AM923 | 2.6 | 20 | 13 | 2.6 | 2.3 | 2 | 1.76 | 4.3 | 4.42 | 0.99 | 5.96 |
| AM924 | 2.7 | 20 | 15.5 | 2.1 | 2.45 | 2.4 | 2.09 | 3.1 | 4.84 | 1.10 | 5.25 |
| AM925 | 3.0 | 20 | 13 | 2.1 | 2.9 | 3.2 | 1.76 | 3.1 | 5.23 | 1.35 | 6.05 |
| AM926 | 2.5 | 20 | 17 | 2.1 | 2.35 | 2.1 | 1.70 | 3.1 | 4.37 | 1.02 | 4.95 |
| AM927 | 2.6 | 20 | 15.5 | 2.3 | 2.5 | 2.2 | 1.55 | 3.7 | 4.46 | 1.08 | 5.60 |
| AM928 | 2.7 | 20 | 13 | 2.6 | 2.6 | 2.2 | 1.30 | 4.2 | 4.46 | 1.11 | 6.06 |
| AM929 | 2.8 | 20 | 15.5 | 2.1 | 2.8 | 2.5 | 1.55 | 3.1 | 4.79 | 1.22 | 5.35 |
| AM930 | 3.1 | 20 | 13 | 2.1 | 3.2 | 3.2 | 1.30 | 3.1 | 5.19 | 1.44 | 6.05 |
| AM931 | 2.8 | 20 | 17 | 2.1 | 2.6 | 2.4 | 1.21 | 3.1 | 4.54 | 1.14 | 5.25 |
| AM932 | 2.9 | 20 | 15.5 | 2.3 | 2.6 | 2.5 | 1.11 | 3.7 | 4.56 | 1.16 | 5.90 |
| AM933 | 3.1 | 20 | 15.5 | 2.1 | 3 | 2.7 | 1.11 | 3.1 | 4.96 | 1.31 | 5.55 |

TABLE 16

Calculated phase fractions and merit indices made with the "Alloys-by-Design" software of the alloys listed in table 17.

| Alloy | γ' | Creep Merit Index ($m^{-2}s \times 10^{-15}$) | Density g/cm$^3$ | Strength Merit Index MPa | Cr/Ti Ratio | Md eV | Hot Cracking Index | Scheil Freezing Range °C. | Cost $/kg |
|---|---|---|---|---|---|---|---|---|---|
| AM922 | 0.31 | 5.62 | 8.63 | 1370 | 7.4 | 0.91 | 1.08 | 271 | 7.94 |
| AM923 | 0.29 | 5.61 | 8.72 | 1323 | 7.4 | 0.91 | 1.20 | 276 | 8.28 |
| AM924 | 0.36 | 5.70 | 8.58 | 1500 | 7.4 | 0.92 | 0.78 | 264 | 8.63 |
| AM925 | 0.39 | 5.67 | 8.63 | 1555 | 7.4 | 0.91 | 0.75 | 263 | 9.41 |
| AM926 | 0.30 | 5.53 | 8.61 | 1377 | 10 | 0.91 | 0.82 | 265 | 8.38 |
| AM927 | 0.31 | 5.65 | 8.66 | 1370 | 10 | 0.91 | 0.87 | 267 | 8.56 |
| AM928 | 0.29 | 5.57 | 8.73 | 1298 | 10 | 0.91 | 1.10 | 272 | 8.55 |
| AM929 | 0.34 | 5.62 | 8.61 | 1453 | 10 | 0.91 | 0.72 | 262 | 8.84 |
| AM930 | 0.38 | 5.60 | 8.64 | 1511 | 10 | 0.91 | 0.73 | 262 | 9.51 |
| AM931 | 0.32 | 5.63 | 8.60 | 1389 | 14 | 0.92 | 0.66 | 260 | 8.82 |
| AM932 | 0.32 | 5.72 | 8.66 | 1369 | 14 | 0.92 | 0.76 | 264 | 8.95 |
| AM933 | 0.36 | 5.73 | 8.59 | 1458 | 14 | 0.92 | 0.63 | 259 | 9.17 |

Tables 15 and 16 display a series of alloys in which the Cr/Ti ratio is manipulated. Alloys AM922 to AM925 have the same ratio as ABD-900AM, but proportionately lower amounts of both Cr and Ti. This may improve oxidation performance and allow for increases in mechanical properties. In alloys AM922 and AM923, the γ' content is held close to constant by slightly increasing the proportion of other γ'-forming elements, and the levels of Mo and W are increased to maintain the same Md number. In alloys AM924 and AM925, the γ' content is further increased over that of ABD-900AM without altering the Mo and W content.

Alloy AM926 represents a variant of ABD-900AM, but with titanium content reduced to ensure a Cr/Ti ratio of 10 for improved oxidation resistance; the levels of other γ'-forming elements have been increased in proportion in order to maintain the same γ' fraction. Alloys AM927 to AM930 are homologous to AM922-AM927, only with the Cr/Ti ratio fixed at 10. Similarly, alloys AM931-AM933 are homologous to AM926-AM930 but with a Cr/Ti ratio of 14; the alloys at this ratio with a Cr content of 13 have not been considered, since they fall below the required level of Ti for the invention.

TABLE 17

Nominal compositions in wt % of the newly designed high volume fraction of γ' nickel-based superalloys. C and B levels are fixed at 0.04 wt. % and 0.005 wt % respectively.

| Alloy | Al | Co | Cr | Mo | Nb | Ta | Ti | W | f(SAC) | f(HCI) | f(density) |
|---|---|---|---|---|---|---|---|---|---|---|---|
| AM934 | 2.7 | 20 | 15.5 | 2.3 | 2.6 | 2.2 | 2.09 | 3.7 | 4.81 | 1.11 | 5.60 |
| AM935 | 2.8 | 20 | 13 | 2.6 | 3.3 | 2 | 1.76 | 4.3 | 4.92 | 1.29 | 5.96 |
| AM936 | 2.9 | 20 | 15.5 | 2.1 | 2.95 | 2.9 | 2.09 | 3.1 | 5.27 | 1.32 | 5.75 |
| AM937 | 3.2 | 20 | 13 | 2.1 | 3.7 | 3.2 | 1.76 | 3.1 | 5.67 | 1.59 | 6.05 |
| AM938 | 2.7 | 20 | 17 | 2.1 | 2.8 | 2.6 | 1.70 | 3.1 | 4.78 | 1.23 | 5.45 |
| AM939 | 2.8 | 20 | 15.5 | 2.3 | 3 | 2.6 | 1.55 | 3.7 | 4.87 | 1.29 | 6.00 |
| AM940 | 2.9 | 20 | 13 | 2.6 | 3.5 | 2.2 | 1.30 | 4.2 | 4.93 | 1.38 | 6.06 |
| AM941 | 3.0 | 20 | 15.5 | 2.1 | 3.3 | 3 | 1.55 | 3.1 | 5.22 | 1.44 | 5.85 |
| AM942 | 3.3 | 20 | 13 | 2.1 | 3.9 | 3.2 | 1.30 | 3.1 | 5.6 | 1.65 | 6.05 |

TABLE 17-continued

Nominal compositions in wt % of the newly designed high volume fraction of γ' nickel-based superalloys. C and B levels are fixed at 0.04 wt. % and 0.005 wt % respectively.

| Alloy | Al | Co | Cr | Mo | Nb | Ta | Ti | W | f(SAC) | f(HCI) | f(density) |
|---|---|---|---|---|---|---|---|---|---|---|---|
| AM943 | 3.0 | 20 | 17 | 2.1 | 3.1 | 2.9 | 1.21 | 3.1 | 4.97 | 1.37 | 5.75 |
| AM944 | 3.1 | 20 | 15.5 | 2.3 | 3.5 | 2.6 | 1.11 | 3.7 | 5.09 | 1.44 | 6.00 |
| AM945 | 3.6 | 20 | 15.5 | 2.1 | 3.6 | 3 | 1.11 | 3.1 | 5.68 | 1.53 | 5.85 |

TABLE 18

Calculated phase fractions and merit indices made with the "Alloys-by-Design" software of the alloys listed in table 19.

| Alloy | γ' | Creep Merit Index ($m^{-2}s \times 10^{-15}$) | Density g/cm³ | Strength Merit Index MPa | Cr/Ti Ratio | Md eV | Hot Cracking Index | Scheil Freezing Range °C. | Cost $/kg |
|---|---|---|---|---|---|---|---|---|---|
| AM934 | 0.37 | 5.99 | 8.61 | 1532 | 7.4 | 0.92 | 0.69 | 261 | 8.70 |
| AM935 | 0.36 | 6.01 | 8.68 | 1513 | 7.4 | 0.92 | 0.78 | 263 | 8.74 |
| AM936 | 0.42 | 6.10 | 8.56 | 1650 | 7.4 | 0.92 | 0.49 | 254 | 9.40 |
| AM937 | 0.45 | 6.07 | 8.59 | 1697 | 7.4 | 0.92 | 0.54 | 253 | 9.80 |
| AM938 | 0.36 | 5.88 | 8.59 | 1531 | 10 | 0.92 | 0.51 | 256 | 9.12 |
| AM939 | 0.37 | 6.01 | 8.64 | 1524 | 10 | 0.92 | 0.58 | 258 | 9.22 |
| AM940 | 0.36 | 5.94 | 8.69 | 1475 | 10 | 0.92 | 0.75 | 261 | 8.97 |
| AM941 | 0.40 | 6.01 | 8.59 | 1607 | 10 | 0.92 | 0.47 | 253 | 9.60 |
| AM942 | 0.43 | 5.96 | 8.60 | 1643 | 10 | 0.92 | 0.55 | 254 | 9.85 |
| AM943 | 0.37 | 5.96 | 8.58 | 1520 | 14 | 0.93 | 0.45 | 254 | 9.51 |
| AM944 | 0.38 | 6.10 | 8.61 | 1521 | 14 | 0.93 | 0.51 | 255 | 9.39 |
| AM945 | 0.44 | 6.26 | 8.51 | 1604 | 14 | 0.93 | 0.45 | 255 | 9.74 |

Tables 17 and 18 describe a series of alloys (AM934 to AM945) that are direct equivalents to those of Tables 15 and 16, with the γ' content having been increased by proportional increase of the function ƒ(SAC). This demonstrates the space of oxidation resistant, high γ', chromia-forming alloys of low hot cracking index that are suitable for additive manufacturing.

The invention claimed is:

1. A nickel-based alloy composition consisting, in weight percent, of: 1.5 to 4.5% aluminium, 1.1 to 3.4% titanium, 0.0 to 4.0% niobium, 0.0 to 5.2% tantalum, 0.9 to 6.6% tungsten, 0.0 to 2.9% molybdenum, 0.0 to 24.0% cobalt, 16.0 to 17.3% chromium, 0.02 to 0.15% carbon, 0.001 to 0.015% boron, 0.0 to 0.1% zirconium, 0.0 to 3.0% rhenium, 0.0 to 2.0% ruthenium, 0.0 to 3.0% iridium, 0.0 to 0.5% vanadium, 0.0 to 1.0% palladium, 0.0 to 1.0% platinum, 0.0 to 0.5% silicon, 0.0 to 0.1% yttrium, 0.0 to 0.1% lanthanum, 0.0 to 0.1% cerium, 0.0 to 0.003% sulphur, 0.0 to 0.25% manganese, 0.0 to 0.1 magnesium, 0.0 to 5.0% iron, 0.0 to 0.5% copper, 0.0 to 1.0% hafnium, the balance being nickel and incidental impurities, wherein the following equations are satisfied in which $W_{Al}$, $W_{Ti}$, $W_{Nb}$, $W_{Ta}$ and $W_W$ are the weight percent of aluminium, titanium, niobium, tantalum and tungsten in the alloy respectively $$0.65 \leq 0.3W_{Nb} + 0.15W_{Ta},$$

$$3.6 \leq W_{Al} + 0.5W_{Ti} + 0.3W_{Nb} + 0.15W_{Ta} \leq 5.7, \text{ and}$$

$$W_{Ta} + 0.92W_W \leq 6.1.$$

2. The nickel-based alloy composition according to claim 1, wherein the following equation is satisfied in which $W_{Al}$, $W_{Ti}$, $W_{Nb}$ and $W_{Ta}$ are the weight percent of aluminium, titanium, niobium and tantalum in the alloy respectively $$4.1 \leq W_{Al} + 0.5W_{Ti} + 0.3W_{Nb} + 0.15W_{Ta}.$$

3. The nickel-based alloy composition according to claim 1, wherein the following equation is satisfied in which $W_{Al}$, $W_{Ti}$, $W_{Nb}$ and $W_{Ta}$ are the weight percent of aluminium, titanium, niobium and tantalum in the alloy respectively $$W_{Al} + 0.5W_{Ti} + 0.3W_{Nb} + 0.15W_{Ta} \leq 5.5.$$

4. The nickel-based alloy composition according to claim 1, wherein the following equation is satisfied in which $W_W$ and $W_{Mo}$ are the weight percent of tungsten and molybdenum in the alloy respectively $$W_W + 0.77W_{Mo} \geq 3.0.$$

5. The nickel-based alloy composition of claim 1, consisting of, in weight percent, 19.5% or less chromium.

6. The nickel-based alloy composition of claim 1, consisting of, in weight percent, 4.2% or less tantalum.

7. The nickel-based alloy composition of claim 1, consisting of, in weight percent, 5.5% or less tungsten.

8. The nickel-based alloy composition of claim 1, consisting of, in weight percent, 3.0% or less niobium.

9. The nickel-based alloy composition of claim 1, consisting of, in weight percent, 1.7% or more aluminium.

10. The nickel-based alloy composition of claim 1, consisting of, in weight percent, 3.9% or less aluminium.

11. The nickel-based alloy composition of claim 1, consisting of, in weight percent, 20.0% or less cobalt.

12. The nickel-based alloy composition according to claim 1, consisting of, in weight percent 0.6% or more tantalum.

13. The nickel-based alloy composition according to claim 1, consisting of, in weight percent 1.2% or more tungsten.

14. The nickel-based alloy composition of claim 1, wherein the following equation is satisfied in which $W_{Nb}$, $W_{Ta}$, $W_{Ti}$, $W_{Pt}$, $W_{Pd}$ and $W_{Al}$ are the weight percent of niobium, tantalum, titanium, platinum, palladium and aluminium, respectively $$W_{Al}+0.5W_{Ti}+0.3W_{Nb}+0.15W_{Ta}+0.125W_{Pt}+0.225W_{Pd} \leq 5.7.$$

15. The nickel-based alloy composition of claim 1, consisting of, in weight percent 5.0% or more cobalt.

16. The nickel-based alloy composition of claim 1, consisting of, in weight percent 0.6% or more niobium.

17. The nickel-based alloy composition of claim 1, wherein the following equation is satisfied in which $W_{Cr}$, and $W_{Ti}$ are the weight percent of chromium and titanium, respectively $$\frac{W_{Cr}}{W_{Ti}} \geq 6.0.$$

18. The nickel-based alloy composition of claim 1, wherein the following equation is satisfied in which $W_{Ta}$, and $W_W$ are the weight percent of tantalum and tungsten, respectively $$W_{Ta}+0.92W_W \leq 5.4.$$

19. The nickel-based composition of claim 1, wherein the following equation is satisfied in which $W_{Nb}$ and $W_{Ta}$ are the weight percent of niobium and tantalum, respectively $$0.68 \leq 0.3W_{Nb}+0.15W_{Ta}.$$

* * * * *